United States Patent
Kojo et al.

(10) Patent No.: US 11,731,695 B2
(45) Date of Patent: Aug. 22, 2023

(54) VEHICLE CONTROL APPARATUS AND METHOD

(71) Applicants: Toyota Jidosha Kabushiki Kaisha, Toyota (JP); Denso Corporation, Kariya (JP)

(72) Inventors: Takahiro Kojo, Gotemba (JP); Yoji Kunihiro, Susono (JP); Hisaya Akatsuka, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 265 days.

(21) Appl. No.: 17/330,867

(22) Filed: May 26, 2021

(65) Prior Publication Data
US 2021/0371010 A1   Dec. 2, 2021

(30) Foreign Application Priority Data
Jun. 2, 2020  (JP) .................................. 2020-096156

(51) Int. Cl.
*B62D 6/10*   (2006.01)
*B62D 5/04*   (2006.01)

(52) U.S. Cl.
CPC .............. *B62D 6/10* (2013.01); *B62D 5/0427* (2013.01); *B62D 5/0484* (2013.01); *B62D 5/0487* (2013.01)

(58) Field of Classification Search
CPC ...... B62D 6/10; B62D 5/0427; B62D 5/0484; B62D 5/0487
See application file for complete search history.

(56) References Cited

U.S. PATENT DOCUMENTS

| | | | |
|---|---|---|---|
| 10,875,575 B2* | 12/2020 | Kunihiro | G01L 5/221 |
| 2005/0270145 A1 | 12/2005 | Kataoka et al. | |
| 2006/0025918 A1 | 2/2006 | Saeki | |
| 2012/0029773 A1* | 2/2012 | Fujita | B62D 6/00 701/41 |

(Continued)

FOREIGN PATENT DOCUMENTS

| | | | |
|---|---|---|---|
| JP | 2006-315491 A | 11/2006 | |
| JP | 2008-195402 A | 8/2008 | |

(Continued)

*Primary Examiner* — Jeff A Burke
*Assistant Examiner* — Mohamad O El Sayah
(74) *Attorney, Agent, or Firm* — Dinsmore & Shohl LLP

(57) ABSTRACT

Provided is a control apparatus for a vehicle configured to perform steering assist control and driving support control based on a motor control amount, the control apparatus being further configured to correct the motor control amount such that a specific steering amount in a second period becomes smaller than that in a first period, the specific steering amount being an amount of change in a steering angle required for a magnitude of a steering torque to reach a torque threshold, the first period being a period from a first time point at which a driving support operation state is changed to an on state to a second time point at which a driving operation switching request is issued, and the second period being a period from the second time point to a third time point at which the driving support operation state is changed to an off state.

15 Claims, 20 Drawing Sheets

(56) References Cited

U.S. PATENT DOCUMENTS

| | | | | |
|---|---|---|---|---|
| 2015/0066306 A1* | 3/2015 | Kodera | ............... | B62D 5/049 |
| | | | | 701/43 |
| 2016/0033964 A1* | 2/2016 | Sato | ................ | B60K 28/06 |
| | | | | 701/24 |
| 2016/0152267 A1* | 6/2016 | Morimoto | ............ | B62D 15/027 |
| | | | | 701/41 |
| 2016/0236712 A1* | 8/2016 | Shirakata | ............. | B62D 15/029 |
| 2018/0181132 A1* | 6/2018 | Kunihiro | ............. | G05D 1/0088 |
| 2019/0300013 A1* | 10/2019 | Shiraishi | ........... | B60W 60/0053 |
| 2021/0001922 A1* | 1/2021 | Aoyama | ................ | B62D 6/10 |
| 2021/0009194 A1* | 1/2021 | Kim | ..................... | B62D 1/16 |

FOREIGN PATENT DOCUMENTS

| | | |
|---|---|---|
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 2014-148293 A | 8/2014 |
| JP | 2017-124667 A | 7/2017 |
| JP | 2019-001350 A | 1/2019 |

* cited by examiner

VEHICLE CONTROL APPARATUS AND METHOD

CROSS-REFERENCES TO RELATED APPLICATION

The present application claims priority to Japanese patent application No. JP 2020-96156 filed on Jun. 2, 2020, the content of which is hereby incorporated by reference in its entirety.

BACKGROUND

1. Technical Field

The present disclosure relates to a control apparatus and control method for a vehicle.

2. Description of the Related Art

Hitherto, there has been known a control apparatus for a vehicle configured to perform lane keeping assist control for changing an angle of steered wheels such that the vehicle travels along a target travel line (see Japanese Patent Application Laid-open No. 2017-124667). Such control is also referred to as "lane tracing assist control". Hereinafter, the lane keeping assist control is simply referred to as "LKA".

Further, in recent years, as with the LKA, there has been developed a control apparatus configured to perform automated driving control for automatically changing the angle of the steered wheels such that the vehicle travels along a predetermined target travel line. Hereinafter, control such as the LKA or the automatic driving control will be referred to as "driving support control".

It is assumed that a vehicle includes the above-mentioned control apparatus, and a steering mechanism for mechanically connecting a steering wheel and steered wheels (left and right front wheels). In such a vehicle, when a driver operates the steering wheel, the control apparatus applies to the steering mechanism an assist torque for assisting the operation by the driver. In a situation in which an operation state of the driving support control is an on state in the vehicle, when the vehicle deviates from the target travel line due to the steering wheel operation by the driver, the control apparatus attempts to change the angle of the steered wheels so as to return the vehicle to the target travel line. The driver feels a greater load on the operation on the steering wheel than when the operation state of the driving support control is an off state. In view of this, a related-art apparatus disclosed in Japanese Patent Application Laid-open No. 2017-124667 sets a magnitude of the assist torque of when the operation state of the driving support control (in this case, the LKA) is the on state to a larger value than that of when the operation state of the driving support control is the off state. This reduces the load felt by the driver on the operation on the steering wheel.

SUMMARY

Hereinafter, control for changing the angle of the steered wheels will be simply referred to as "steering control". The steering control is changed from the driving support control to a manual steering operation by the driver at a request by the driver or a request by a system. At a time point at which the steering control is changed from the driving support control to the manual steering operation, it is preferred that the driver is in a state in which the driver is ready to operate the steering wheel. The "state in which the driver is ready to operate the steering wheel" refers to a state in which the driver is able to manually operate the vehicle by himself/herself, and therefore, will be hereinafter simply referred to as "manual operation possible state". In view of this, the inventors of the present application have considered an apparatus configured to detect a steering torque acting on a steering shaft by the operation by the driver on the steering wheel, and determine that the driver is in the manual operation possible state when a magnitude of the steering torque reaches a predetermined torque threshold. However, there arises a problem in the related-art apparatus. The related-art apparatus sets the magnitude of the assist torque to a larger value during the driving support control. Thus, the driver has to operate the steering wheel by a larger angle in order for the steering torque to reach the torque threshold. As a result, a lateral movement amount of the vehicle becomes large.

The present disclosure provides a vehicle control apparatus capable of determining that the driver is in the manual operation possible state while preventing the lateral movement amount of the vehicle from becoming large in the case in which the steering control is changed from the driving support control to the manual steering operation by the driver.

In one or more embodiments, there is provided a control apparatus for a vehicle. The control apparatus includes a steering mechanism that mechanically connects a steering wheel of the vehicle and a steered wheel via a steering shaft, a motor provided in the steering mechanism and configured to generate a torque for changing an angle of the steered wheel, a steering torque sensor configured to detect a steering torque acting on the steering shaft by an operation by a driver on the steering wheel, and a controller. The controller is configured to calculate a first control amount for assisting the operation by the driver on the steering wheel based on the steering torque, and perform steering assist control for driving the motor based on the first control amount. The controller is configured to, in a case in which a driving support operation state is an on state, calculate a second control amount for changing the angle of the steered wheel such that the vehicle travels along a predetermined target travel line, and perform driving support control for driving the motor based on the second control amount. The controller is configured to, in a case in which the driving support operation state is an off state, calculate a motor control amount based on the first control amount, and perform the steering assist control by generating the torque corresponding to the motor control amount in the motor. The controller is configured to, in the case in which the driving support operation state is the on state, calculate the motor control amount based on the first control amount and the second control amount, and perform the steering assist control and the driving support control by generating the torque corresponding to the motor control amount in the motor. The controller is configured to, in a case in which a driving operation switching request, which is a request for changing the driving support operation state from the on state to the off state, is issued, determine whether a magnitude of the steering torque reaches a predetermined torque threshold, and when determining that the magnitude of the steering torque reaches the torque threshold, determine that the driver is in a manual operation possible state in which the driver is ready to operate the steering wheel. The controller is configured to calculate the motor control amount in a first period such that the magnitude of the steering torque reaches the torque threshold when the driver changes a magnitude of a steering angle of the steering wheel by a first angle. The first period is a period from a time point at which the driving support operation state is changed from the off state to the on state to a time point at which the driving operation switching request is issued. The controller is configured to calculate the motor control amount in a second period such that the magnitude of the steering torque reaches the torque threshold when the driver changes the magnitude of the steering angle of the steering wheel by a second angle smaller than the first angle. The second period is a period from the time point at which the driving operation switching request is issued to a time point at which the driving support operation state is changed from the on state to the off state.

Hereinafter, an "amount of change in the steering angle of the steering wheel required for the magnitude of the steering torque to reach the torque threshold" will be referred to as "specific steering amount". According to the above configuration, the specific steering amount (second angle) in the second period becomes smaller than the specific steering amount (first angle) in the first period. Even when the driver operates the steering wheel to indicate to the control apparatus that he/she is in the manual operation possible state, the control apparatus can prevent the lateral movement amount of the vehicle from becoming large.

In one or more embodiments, the controller is configured to execute, in the second period, first correction processing for changing a first proportion that is a proportion of the first control amount in the motor control amount. The controller is configured to execute the first correction processing such that, for the steering torque having a same magnitude, the first proportion in the second period becomes smaller than the first proportion in the first period.

According to the above configuration, the control apparatus can change the first proportion in the second period to thereby make the specific steering amount in the second period smaller than the specific steering amount in the first period.

In one or more embodiments, the driving operation switching request includes a first request issued in response to an operation by the driver on an operation device, and a second request issued when a predetermined abnormality is detected. The controller is configured to execute the first correction processing such that the first proportion in a case in which the second request is issued becomes smaller than the first proportion in a case in which the first request is issued. The controller is configured to, in the case in which the first request is issued, calculate the motor control amount such that the magnitude of the steering torque reaches the torque threshold when the driver changes the magnitude of the steering angle of the steering wheel by the second angle in the second period. The controller is configured to, in the case in which the second request is issued, calculate the motor control amount such that the magnitude of the steering torque reaches the torque threshold when the driver changes the magnitude of the steering angle of the steering wheel by a third angle smaller than the second angle in the second period.

According to the above configuration, the specific steering amount (third angle) in the case in which the second request is issued becomes smaller than the specific steering amount (second angle) in the case in which the first request is issued. In the case in which the second request is issued, the driver operates the steering wheel with a smaller amount of change in the steering angle to thereby indicate to the control apparatus that he/she has become the manual operation possible state. Further, the control apparatus suppresses the lateral movement amount of the vehicle in the situation in which the abnormality has occurred. Therefore, safety can be increased.

In one or more embodiments, the first control amount includes a basic assist amount for assisting the operation by the driver on the steering wheel, and a compensation assist amount for compensating at least a part of the basic assist amount canceled by the second control amount. The controller is configured to execute, as the first correction processing, second correction processing for changing a second proportion that is a proportion of the compensation assist amount in the motor control amount in the second period. The controller is configured to execute the second correction processing such that, for the steering torque having a same magnitude, the second proportion in the second period becomes smaller than the second proportion in the first period.

According to the above configuration, the control apparatus can change the second proportion in the second period to thereby make the specific steering amount in the second period smaller than the specific steering amount in the first period.

In one or more embodiments, in a case in which the magnitude of the steering torque is larger than the torque threshold, the controller is configured to execute the first correction processing such that, as the magnitude of the steering torque increases, the first proportion in the second period approaches the first proportion in the first period.

According to the above configuration, when the driver operates the steering wheel with a large torque exceeding the torque threshold, the load felt by the driver is suppressed. Specifically, as the magnitude of the steering torque is increased, the driver can operate the steering wheel with a feeling similar to that in the first period. Therefore, when the driver intentionally steers the steering wheel greatly, the control apparatus can easily reflect the intention of the driver.

In one or more embodiments, the control apparatus further includes a detector configured to detect whether the driver holds the steering wheel. The controller is configured to, in a case in which the detector determines that the driver holds the steering wheel at the time point at which the driving operation switching request is issued, execute, as the first correction processing, third correction processing for gradually reducing the first proportion in the second period with a lapse of time from the time point at which the driving operation switching request is issued.

According to the above configuration, in the case in which the driver holds the steering wheel, the load on the steering wheel operation is gradually changed without being suddenly changed. Therefore, the possibility that the driver feels a sense of discomfort can be reduced. The first proportion is gradually reduced with the lapse of time from the time when the driving operation switching request is issued. Therefore, the specific steering amount in the second period becomes smaller than the specific steering amount in the first period. Even when the driver operates the steering wheel to indicate to the control apparatus that he/she is in the manual operation possible state, the lateral movement amount of the vehicle is suppressed.

In one or more embodiments, the driving operation switching request includes a first request issued in response to an operation by the driver on an operation device, and a second request issued when a predetermined abnormality is detected. The controller is configured to execute the third correction processing such that an amount of reduction in the first proportion per unit time in a case in which the second request is issued becomes larger than the amount of reduction in the first proportion per unit time in a case in which the first request is issued.

According to the above configuration, the specific steering amount in the case in which the second request is issued becomes smaller than the specific steering amount in the case in which the first request is issued. In the case in which the second request is issued, the driver operates the steering wheel with a smaller change amount in the steering angle to thereby indicate to the control apparatus that he/she has become the manual operation possible state. Further, the load felt by the driver on the steering wheel in the case in which the second request is issued becomes larger than that of the case in which the first request is issued. This load enables the driver to recognize that the abnormality has occurred.

In one or more embodiments, the controller is configured to execute the third correction processing such that, the larger the magnitude of the steering torque, the smaller the amount of reduction in the first proportion per unit time.

According to the above configuration, when the driver inputs a large torque to the steering wheel, an amount of change in the load with respect to the operation on the steering wheel becomes small. Therefore, the possibility that the driver feels a sense of discomfort can be reduced.

In one or more embodiments, the control apparatus further includes a detector configured to detect whether the driver holds the steering wheel. The controller is configured to execute, in the second period, third correction processing for gradually reducing a first proportion with a lapse of time from the time point at which the driving operation switching request is issued. The first proportion is a proportion of the first control amount in the motor control amount. The controller is configured to execute the third correction processing such that, for the steering torque having a same magnitude, the first proportion in the second period becomes smaller than the first proportion in the first period. The controller is configured to execute the third correction processing such that an amount of reduction in the first proportion per unit time in a case in which the detector determines that the driver holds the steering wheel becomes smaller than the amount of reduction in the first proportion per unit time in a case in which the detector determines that the driver does not hold the steering wheel.

According to the above configuration, the amount of change in the load with respect to the operation on the steering wheel in the case in which the driver holds the steering wheel is small compared with the amount of change in the load in the case in which the driver does not hold the steering wheel. Therefore, the possibility that the driver feels a sense of discomfort can be reduced. Further, the first proportion is gradually reduced with the lapse of time from the time point at which the driving operation switching request is issued. Therefore, the specific steering amount in the second period becomes smaller than the specific steering amount in the first period. Even when the driver operates the steering wheel in the second period to indicate to the control apparatus that he/she is in the manual operation possible state, the lateral movement amount of the vehicle is suppressed.

In one or more embodiments, there is provided a control method for a vehicle. The vehicle includes a steering mechanism that mechanically connects a steering wheel of the vehicle and a steered wheel via a steering shaft, a motor provided in the steering mechanism and configured to generate a torque for changing an angle of the steered wheel, and a steering torque sensor configured to detect a steering torque acting on the steering shaft by an operation by a driver on the steering wheel. The control method includes calculating a first control amount for assisting the operation by the driver on the steering wheel based on the steering torque, and performing steering assist control for driving the motor based on the first control amount. The control method further includes, in a case in which a driving support operation state is an on state, calculating a second control amount for changing the angle of the steered wheel such that the vehicle travels along a predetermined target travel line, and performing driving support control for driving the motor based on the second control amount. The control method further includes first controlling including, in a case in which the driving support operation state is an off state, calculating a motor control amount based on the first control amount, and performing the steering assist control by generating the torque corresponding to the motor control amount in the motor. The control method further includes second controlling including, in the case in which the driving support operation state is the on state, calculating the motor control amount based on the first control amount and the second control amount, and performing the steering assist control and the driving support control by generating the torque corresponding to the motor control amount in the motor. The control method further includes: in a case in which a driving operation switching request, which is a request for changing the driving support operation state from the on state to the off state, is issued, determining whether a magnitude of the steering torque reaches a predetermined torque threshold; and when determining that the magnitude of the steering torque reaches the torque threshold, determining that the driver is in a manual operation possible state in which the driver is ready to operate the steering wheel. The second controlling further includes first calculating including calculating the motor control amount in a first period such that the magnitude of the steering torque reaches the torque threshold when the driver changes a magnitude of a steering angle of the steering wheel by a first angle. The first period is a period from a time point at which the driving support operation state is changed from the off state to the on state to a time point at which the driving operation switching request is issued. The second controlling further includes second calculating including calculating the motor control amount in a second period such that the magnitude of the steering torque reaches the torque threshold when the driver changes the magnitude of the steering angle of the steering wheel by a second angle smaller than the first angle. The second period is a period from the time point at which the driving operation switching request is issued to a time point at which the driving support operation state is changed from the on state to the off state.

According to the above configuration, even when the driver operates the steering wheel in the second period to indicate to the vehicle control apparatus that he/she is in the manual operation possible state, the lateral movement amount of the vehicle is suppressed.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

DESCRIPTION OF THE EMBODIMENTS

First Embodiment

A control apparatus (hereinafter may be referred to as "first apparatus") according to a first embodiment is applied to a vehicle. The vehicle to which the control apparatus is applied may be referred to as "host vehicle" for distinction from other vehicles.

Figure 1:
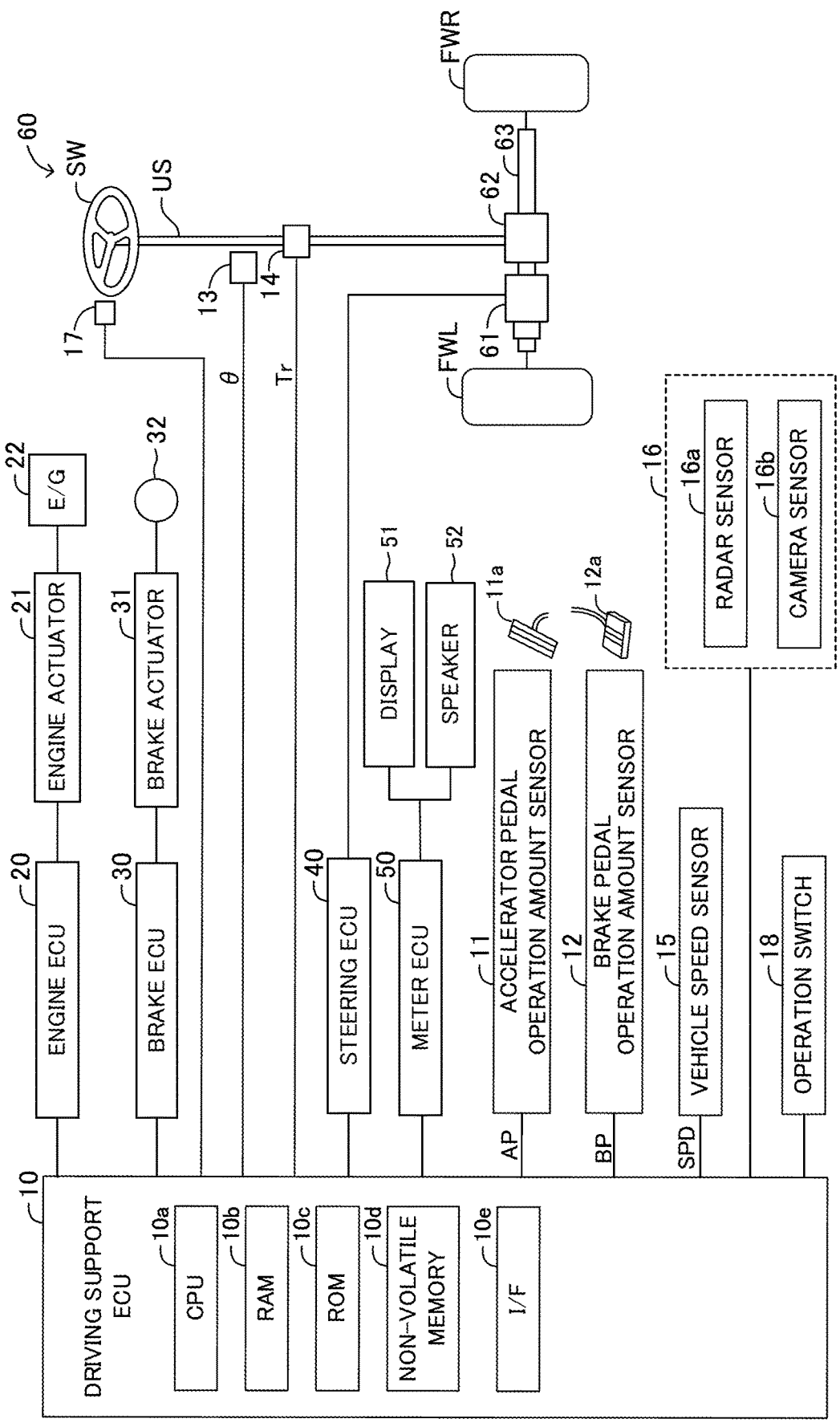
FIG. 1 is a schematic configuration diagram of a control apparatus for a vehicle according to a first embodiment.

As illustrated in FIG. 1, the control apparatus includes a driving support ECU 10, an engine ECU 20, a brake ECU 30, a steering ECU 40, and a meter ECU 50. Those ECUs are electric control units each including a microcomputer as a main part, and are connected to each other such that information can be transmitted and received to and from each other via a controller area network (CAN) (not shown). The microcomputer herein includes a CPU, a RAM, a ROM, a non-volatile memory, an interface (I/F), and the like. For example, the driving support ECU 10 includes a microcomputer including a CPU, a RAM, a ROM, a non-volatile memory, an interface (I/F), and the like. The CPU executes instructions (programs and routines) stored in the ROM to realize various functions. For example, the driving support ECU 10 includes a microcomputer including a CPU $10a$, a RAM $10b$, a ROM $10c$, a non-volatile memory $10d$, an interface (I/F) $10e$, and the like.

The driving support ECU 10 is connected to sensors (including a switch) listed below, and is configured to receive detection signals or output signals from those sensors.

An accelerator pedal operation amount sensor 11 is configured to detect an operation amount (accelerator opening) AP of an accelerator pedal $11a$, and output a signal indicative of the accelerator pedal operation amount AP. A brake pedal operation amount sensor 12 is configured to detect an operation amount BP of a brake pedal $12a$, and output a signal indicative of the brake pedal operation amount BP.

A steering angle sensor 13 is configured to detect a steering angle θ of a steering wheel SW, and output a signal indicative of the steering angle θ. A value of the steering angle θ becomes a positive value when the steering wheel SW is rotated in a first direction (left direction) from a predetermined reference position (neutral position). The value of the steering angle θ becomes a negative value when the steering wheel SW is rotated in a second direction (right direction) opposite to the first direction from the reference position. The neutral position is a position at which the steering angle θ is zero, and is thus a position of the steering wheel SW at a time when the vehicle travels straight. In one or more embodiments, the steering angle θ may be detected/calculated by another method. For example, the steering angle θ may be obtained based on an angle of a motor 61 described later and a gear ratio. That is, the steering angle θ may be a value obtained by converting the angle of the motor 61 into a rotation angle of a shaft of the steering wheel SW. A steering torque sensor 14 is configured to detect a steering torque Tr acting on a steering shaft US by the operation (steering operation) by a driver on the steering wheel SW, and output a signal indicative of the steering torque Tr. A value of the steering torque Tr becomes a positive value when the steering wheel SW is rotated in the first direction (left direction). The value of the steering torque Tr becomes a negative value when the steering wheel SW is rotated in the second direction (right direction). A vehicle speed sensor 15 is configured to detect a traveling speed (vehicle speed) SPD of the vehicle, and output a signal indicative of the vehicle speed SPD.

An ambient sensor 16 is configured to acquire information on a road (including a lane in which the vehicle travels) around the vehicle, and information on three-dimensional objects present on the road. Examples of the three-dimensional objects include moving objects such as pedestrians, automobiles and bicycles, as well as stationary objects such as guard rails and fences. In the following description, these three-dimensional objects are simply referred to as "objects". The ambient sensor 16 includes a radar sensor 16a and a camera sensor 16b.

The radar sensor 16a radiates, for example, a radio wave in a millimeter wave band (hereinafter referred to as "millimeter wave") to a peripheral region including at least a front region of the vehicle, and receives a millimeter wave (namely, a reflected wave) reflected by an object existing in the radiation range. Further, the radar sensor 16a determines whether an object exists, and calculates information on a relative relationship between the vehicle and the object. The information on the relative relationship between the vehicle and the object includes a distance between the vehicle and the object, an orientation (position) of the object with respect to the vehicle, a relative speed between the vehicle and the object, and other such parameters. Hereinafter, the above-mentioned information obtained by the radar sensor 16a (including the information on the relative relationship between the vehicle and the object) will be referred to as "object information".

The camera sensor 16b photographs/captures a scene in front of the vehicle to acquire image data. The camera sensor 16b recognizes, based on the image data, a left lane line and a right lane line (e.g., left and right white lines) which define a lane in which the vehicle travels. The camera sensor 16b calculates a parameter (for example, curvature) indicating the shape of the lane, a parameter indicating a positional relationship between the vehicle and the lane, and other such parameters. The parameter indicating the positional relationship between the vehicle and the lane includes a distance between a center position in a vehicle width direction of the vehicle, and the left white line or right white line, for example. Hereinafter, the above-mentioned information obtained by the camera sensor 16b (including the parameters and the image data) will be referred to as "lane information". In one or more embodiments, the camera sensor 16b may be configured to, based on the image data, determine whether an object exists, and calculate the object information.

The ambient sensor 16 is configured to output to the driving support ECU 10, as vehicle-surroundings information, information on a surroundings situation of the vehicle including the object information and the lane information. The ambient sensor 16 may be referred to as "information acquisition device configured to acquire the vehicle-surroundings information".

A touch sensor 17 is provided on the steering wheel SW, and configured to output a signal indicative of whether the driver holds the steering wheel SW.

An operation switch 18 is a switch to be operated by the driver. The driver operates the operation switch 18 to set an operation state of following-travel inter-vehicle-distance control described later to an on state or an off state. The following-travel inter-vehicle-distance control may be referred to as "Adaptive Cruise Control (ACC)". Hereinafter, this control is simply referred to as "ACC". Further, the driver operates the operation switch 18 to set an operation state of the LKA to an on state or an off state. The LKA is one of the driving support control, and the operation state of the LKA will be referred to as "driving support operation state".

The engine ECU 20 is connected to an engine actuator 21. The engine actuator 21 includes a throttle valve actuator configured to change an opening degree of a throttle valve of an engine 22. The engine ECU 20 can drive the engine actuator 21 to change a torque generated by the engine 22. The torque generated by the engine 22 is transmitted to drive wheels via a transmission (not shown). Thus, the engine ECU 20 can control the engine actuator 21 to control a driving force of the vehicle, to thereby change an acceleration or acceleration state of the vehicle. In one or more embodiments, the vehicle may include a motor as a vehicle driving source in place of or in addition to the engine 22.

The brake ECU 30 is connected to a brake actuator 31 which is a hydraulic control actuator. The brake actuator 31 includes a hydraulic circuit. The hydraulic circuit includes a master cylinder, flow paths through which brake fluid flows, a plurality of valves, pumps, and motors configured to drive the pumps. The brake actuator 31 adjusts a hydraulic pressure to be supplied to a wheel cylinder in a brake mechanism 32 in accordance with an instruction from the brake ECU 30. The hydraulic pressure causes the wheel cylinder to generate a friction braking force for a wheel. Thus, the brake ECU 30 can control the brake actuator 31 to control the braking force of the vehicle, to thereby change an acceleration state (a deceleration, namely, a negative acceleration) of the vehicle.

The steering ECU 40 is a control device for a widely-known electric power steering system, and is connected to the motor 61 built into a steering mechanism 60. The steering mechanism 60 is a mechanism configured to steer a left front wheel FWL and a right front wheel FWR by a rotation operation on the steering wheel SW. The steering wheel SW is rotatably connected to one end of the steering shaft US. A pinion gear 62 is rotatably connected to the other end of the steering shaft US. The steering shaft US includes an upper shaft connected to the steering wheel SW, an intermediate shaft connected to the upper shaft, a torsion bar connected to the intermediate shaft, and a lower shaft connected to the torsion bar. The pinion gear 62 is connected to the other end of the lower shaft. The steering torque sensor 14 detects the steering torque Tr based on a torsion amount of the torsion bar.

A rotational motion of the pinion gear 62 is converted to a reciprocal linear motion of a rack bar 63. Respective steered wheels (the left front wheel FWL and the right front wheel FWR) are connected to both ends of the rack bar 63 through tie rods (not shown) so as to be capable of being steered. The steering wheel SW and the wheels (steered wheels) are mechanically coupled to each other in such a manner. Steered angles of the steered wheels (the left front wheel FWL and the right front wheel FWR) are changed in accordance with the rotation of the steering wheel SW. The motor 61 is mounted to the rack bar 63. The motor 61 is configured to generate a torque the steered angles of the steered wheels in accordance with an instruction from the steering ECU 40.

The meter ECU 50 is connected to a display 51 and a speaker 52. The display 51 is a multi-information display disposed in front of the driver's seat. When the speaker 52 receives a sound command from the driving support ECU 10, the speaker 52 utters/generates a sound according to the sound command. The display 51 and the speaker 52 may be collectively referred to as "notification device".

Steering Assist Control

Figure 2:
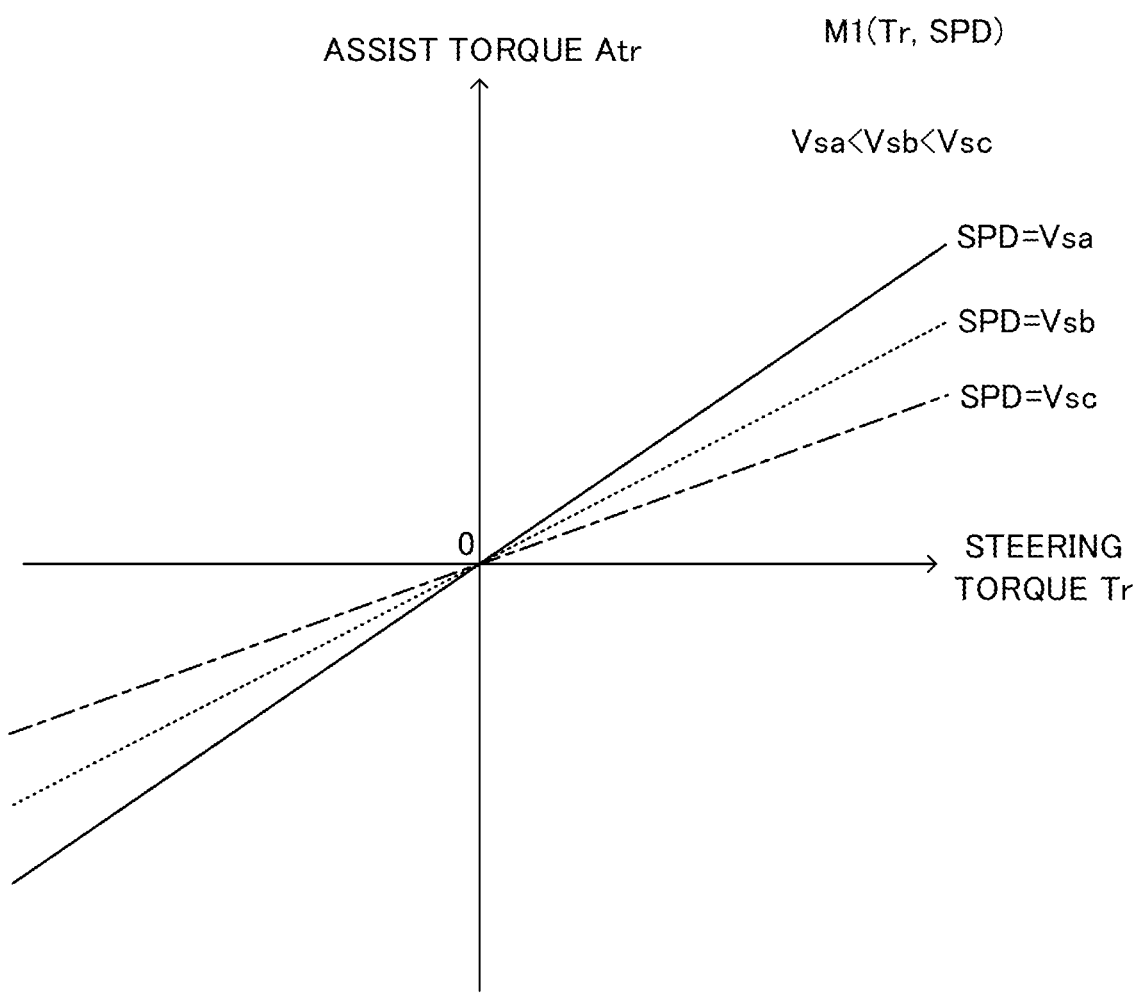
FIG. 2 is a diagram for illustrating a first map M1 representing a relationship between a steering torque Tr, a vehicle speed SPD, and an assist torque Atr.

Hereinafter, the driving support ECU 10 will be simply referred to as "ECU 10". The ECU 10 is configured to perform well-known steering assist control. The steering assist control is control for driving the motor 61 to assist the operation by the driver on the steering wheel SW. The ECU 10 applies the steering torque Tr and the vehicle speed SPD to a first map M1 (Tr, SPD) illustrated in FIG. 2 to obtain an assist torque Atr. As described above, the steering torque Tr is a torque acting on the steering shaft US by the operation by the driver on the steering wheel SW. When the assist torque Atr is a positive value, the motor 61 applies to the steering mechanism 60 a torque for assisting the operation on the steering wheel SW in the first direction (left direction). When the assist torque Atr is a negative value, the motor 61 applies to the steering mechanism 60 a torque for assisting the operation on the steering wheel SW in the second direction (right direction). The assist torque Atr is a control amount for assisting the operation by the driver on the steering wheel SW, and will be referred to as "first control amount".

In the first map M1, the larger a magnitude |Tr| of the steering torque Tr, the larger a magnitude |Atr| of the assist torque Atr. Further, the lower the vehicle speed SPD, the larger the magnitude |Atr| of the assist torque Atr.

As described later, in the case in which the operation state of the LKA is the off state, the ECU 10 controls the motor 61 by using the steering ECU 40 such that an actual torque generated by the motor 61 matches (becomes equal to) the assist torque Atr calculated by the first map M1. In one or more embodiments, the steering ECU 40 may perform the entire steering assist control.

ACC

The ECU 10 is configured to perform the ACC (see, for example, Japanese Patent Application Laid-Open No. 2014-148293, Japanese Patent Application Laid-Open No. 2006-315491, and Japanese Patent No. 4172434).

The ACC includes two types of controls; i.e., constant speed travel control, and preceding-vehicle following-travel control. The constant speed travel control is control for controlling/adjusting the acceleration of the vehicle such that the traveling speed of the vehicle matches (becomes equal to) a target speed (set speed) Vset, without requiring operations of the accelerator pedal 11a and the brake pedal 12a. The preceding-vehicle following-travel control is control for causing the host vehicle to follow a preceding vehicle (following target vehicle) traveling in the front region of the host vehicle while maintaining an inter-vehicle distance between the preceding vehicle and the host vehicle at a target inter-vehicle distance Dset, without requiring operations of the accelerator pedal 11a and the brake pedal 12a. The following target vehicle is a vehicle that travels in the front region of the host vehicle and travels immediately ahead of the host vehicle.

As the operation state of the ACC is set to the on state in response to the operation by the driver on the operation switch 18, the ECU 10 determines, based on the object information, whether the following target vehicle is present. When the ECU 10 determines that the following target vehicle is not present, the ECU 10 performs the constant speed travel control. In order that the vehicle speed SPD matches the target speed Vset, the ECU 10 controls the driving force by controlling the engine actuator 21 by using the engine ECU 20 and, when necessary, controls the braking force by controlling the brake actuator 31 by using the brake ECU 30.

On the other hand, when the ECU 10 determines that the following target vehicle is present, the ECU 10 performs the preceding-vehicle following-travel control. Specifically, the ECU 10 multiplies a target inter-vehicle time Tw by the vehicle speed SPD to obtain a target inter-vehicle distance Dset (Dset=Tw×SPD). The target inter-vehicle time Tw is set by using an inter-vehicle time switch (not shown). In order to render the inter-vehicle distance between the host vehicle and the following target vehicle coincident with the target inter-vehicle distance Dset, the ECU 10 controls the driving force by controlling the engine actuator 21 by using the engine ECU 20 and, when necessary, controls the braking force by controlling the brake actuator 31 by using the brake ECU 30.

(LKA)

The ECU 10 is configured to perform the LKA as one mode/aspect of the driving support control. In the present embodiment, the ECU 10 is configured to set the operation state of the LKA to the on state in response to the operation by the driver on the operation switch 18 in the case in which the operation state of the ACC is the on state.

The LKA is control for changing the angle of the steered wheels by applying an automatic steering torque Btr to the steering mechanism 60 such that the vehicle travels along a target travel line TL set by using one or both of the lane lines (left and right white lines) and a trajectory/locus of the preceding vehicle (that is, preceding-vehicle trajectory). The LKA itself is well known (see, for example, Japanese Patent Application Laid-open No. 2008-195402, Japanese Patent Application Laid-open No. 2009-190464, Japanese Patent Application Laid-open No. 2010-6279, and Japanese Patent No. 4349210). The automatic steering torque Btr is different from the above-described assist torque, and is a torque applied to the steering mechanism 60 by driving the motor 61 regardless of the operation by the driver on the steering wheel SW.

Figure 3:
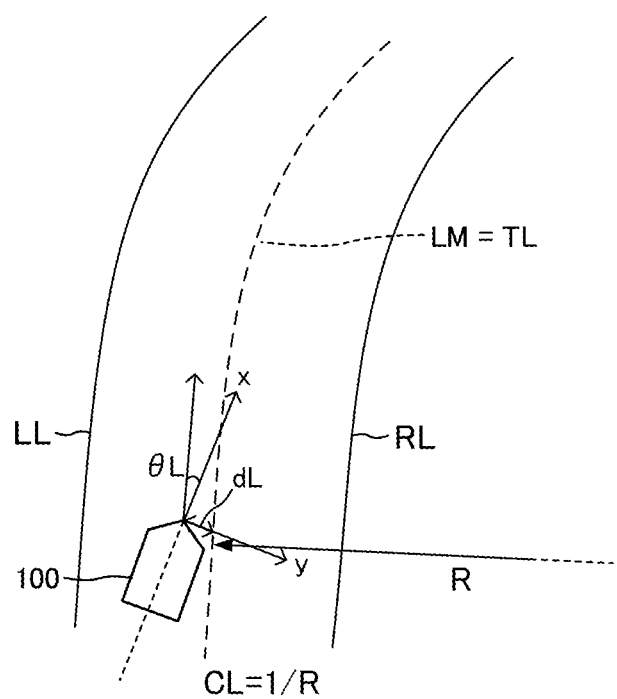
FIG. 3 is a plan view for illustrating a situation in which lane keeping assist control (LKA) is performed by using a target travel line set based on a center line of a lane in which the vehicle travels.

As illustrated in FIG. 3, it is assumed that the ECU 10 can acquire, based on the lane information included in the vehicle-surroundings information, information on a left lane line LL and a right lane line RL defining a lane in which the host vehicle 100 is traveling. The ECU 10 estimates, as a "center line LM of the lane", a line connecting center positions between the left lane line LL and the right lane line RL in a road widthwise direction to one another. The ECU 10 sets the center line LM as the target travel line TL.

Figure 4:
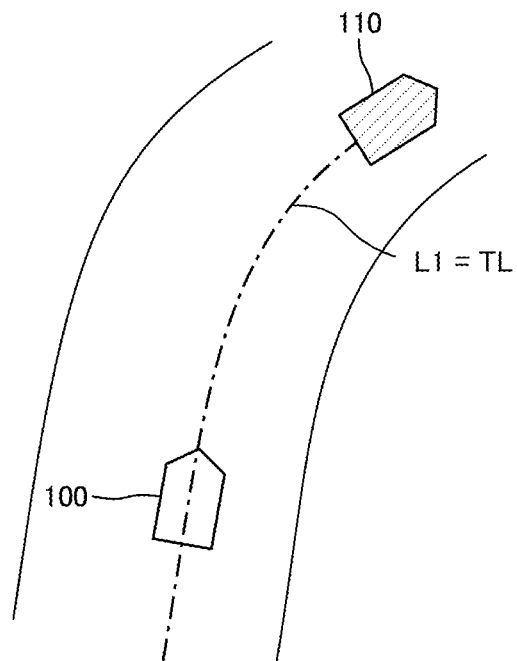
FIG. 4 is a plan view for illustrating a situation in which the LKA is performed by using a target travel line set based on a preceding vehicle trajectory.

On the other hand, it is assumed that the ECU 10 cannot acquire the information on the left lane line LL and the right lane line RL. The ECU 10 identifies the preceding vehicle, which is an object for which the preceding-vehicle trajectory is to be generated, as in the case of the following target vehicle for the ACC. For example, as illustrated in FIG. 4, the ECU 10 calculates a preceding-vehicle trajectory L1 based on positional information on a preceding vehicle 110 included in the object information. The ECU 10 sets the preceding-vehicle trajectory L1 as the target travel line TL.

Figure 5:
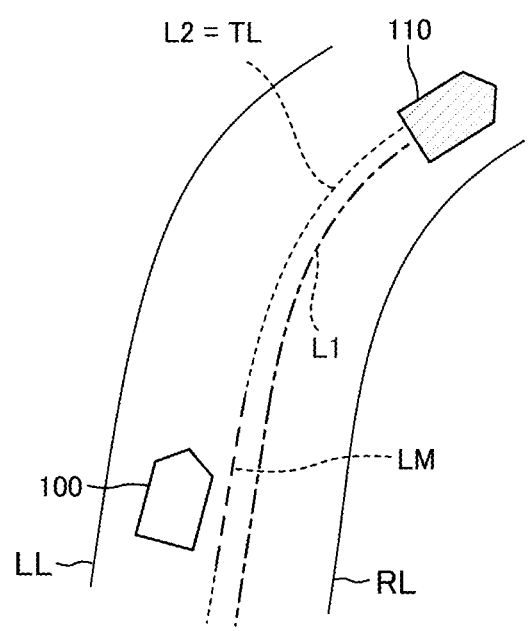
FIG. 5 is a diagram for illustrating processing for correcting/modifying the preceding vehicle trajectory based on the center line of the lane.

In one or more embodiments, the ECU 10 may set the target travel line TL through the use of a combination of the preceding-vehicle trajectory L1 and the center line LM. More specifically, as illustrated in FIG. 5, the ECU 10 corrects the preceding-vehicle trajectory L1 such that the preceding-vehicle trajectory L1 becomes a "trajectory maintaining the shape (curvature) of the preceding-vehicle trajectory L1, and matching the position of the center line LM and the direction (tangent direction) of the center line LM in a vicinity of the host vehicle 100". Then, the ECU 10 may determine such a corrected preceding-vehicle trajectory L2 as the target travel line TL.

In FIG. 3, a center axis extending in a front-rear direction of the host vehicle 100 is set as an x-axis, and the axis orthogonal to the x-axis is set as a y-axis. The ECU 10 calculates LKA control parameters for performing the LKA. As illustrated in FIG. 3, the LKA control parameters include a curvature CL of the target travel line TL, a distance dL, a yaw angle θL, and the like. The curvature CL is a reciprocal of a curvature radius R of the center line LM. The distance dL is a distance in the y-axis direction (substantially the road widthwise direction) between the target travel line TL and the center position of the vehicle 100 in the vehicle width direction. The yaw angle θL is an angle between the axis extending in the front-rear direction of the vehicle 100 and the target travel line TL.

The ECU 10 uses the LKA control parameters (CL, dL, and θL) to calculate the automatic steering torque Btr for causing the vehicle 100 to travel along the target travel line TL. For example, the ECU 10 calculates the automatic steering torque Btr according to Expression A described below.

$$Btr = K1 \cdot (SPD^2 \cdot CL) + K2 \cdot dL + K3 \cdot \theta L \tag{A}$$

K1, K2 and K3 are control gains, respectively. For example, K1 is set to a positive value (K1>0) when the lane is curved to the left, and is set to a negative value (K1<0) when the lane is curved to the right.

When the automatic steering torque Btr is a positive value, the motor 61 applies to the steering mechanism 60 a torque for steering the steered wheels to the left. When the automatic steering torque Btr is a negative value, the motor 61 applies to the steering mechanism 60 a torque for steering the steered wheels to the right. The automatic steering torque Btr is a control amount for causing the vehicle 100 to travel along the target travel line TL (or bringing a center position of a front end portion of the vehicle 100 in the vehicle width direction closer to the target travel line TL), and will be referred to as "second control amount".

In one or more embodiments, the ECU 10 may apply the LKA control parameters (CL, dL and θL) to a predefined automatic steering torque map MBtr (CL, dL, θL) to thereby obtain the automatic steering torque Btr.

The ECU 10 controls the motor 61 by using the steering ECU 40 such that an actual torque generated by the motor 61 matches the automatic steering torque Btr.

(Driving Operation Switching Request)

The ECU 10 determines whether a driving operation switching request is issued in the case in which the operation state of the LKA is the on state. The driving operation switching request is a request for changing the operation state of the LKA from the on state to the off state. The driving operation switching request includes a first request issued in response to the operation by the driver on the operation switch 18, and a second request issued when a predetermined abnormality is detected. The abnormality includes an LKA system abnormality. In one or more embodiments, the LKA system abnormality includes at least one of an abnormality in the ambient sensor 16, an abnormality in the notification device, an abnormality in the engine actuator 21, an abnormality in the brake actuator 31, and an abnormality in a component (for example, the motor 61) of the steering mechanism 60. The ECU 10 executes a routine (not shown) to monitor whether the LKA system abnormality has occurred.

A period until an elapsed time Tep since the driving operation switching request is issued reaches a predetermined time threshold Tmth is a transition period for switching/transferring the steering control from the LKA to the manual operation by the driver. During the transition period, the LKA is continuously performed (that is, the operation state of the LKA is maintained in the on state). At an end time point of the transition period, the LKA is terminated (that is, the operation state of the LKA is changed from the on state to the off state).

During the transition period, the ECU 10 determines whether the driver is in the manual operation possible state. Specifically, in the transition period, the ECU 10 determines whether the magnitude |Tr| of the steering torque Tr detected by the steering torque sensor 14 reaches a predetermined torque threshold Trth. When determining that the magnitude |Tr| of the steering torque Tr reaches the torque threshold Trth in the transition period, the ECU 10 determines that the driver is in the manual operation possible state.

The ECU 10 executes alert processing until the ECU 10 determines that the driver is in the manual operation possible state during the transition period. The alert processing is processing for urging the driver to operate the steering wheel SW. In addition, even if the ECU 10 determines that the driver is in the manual operation possible state, the ECU 10 does not immediately terminate the LKA at that determination time point, but terminates the LKA at the end time point of the transition period.

Further, once the ECU 10 determines that the driver is in the manual operation possible state in the transition period, the ECU 10 does not determine whether the driver is in the manual operation possible state in a period from that determination time point to the end time point of the transition period.

(Steering Assist Control During LKA)

Hereinafter, a period from a "time point at which the operation state of the LKA is changed from the off state to the on state" to a "time point at which the driving operation switching request is issued" will be referred to as "first period". In addition, a period from the "time point at which the driving operation switching request is issued" to a "time point at which the operation state of the LKA is changed from the on state to the off state (that is, the elapsed time Tep reaches the time threshold Tmth)" will be referred to as "second period". This second period is the same as the above-described transition period. The steering assist control during the execution of the LKA will be described separately for the first period and the second period.

(1) First Period

The ECU 10 increases the magnitude of the assist torque Atr in the first period as compared with the case in which the operation state of the LKA is the off state. As a result, the load felt by the driver for the operation on the steering wheel SW does not become large.

Figure 6:
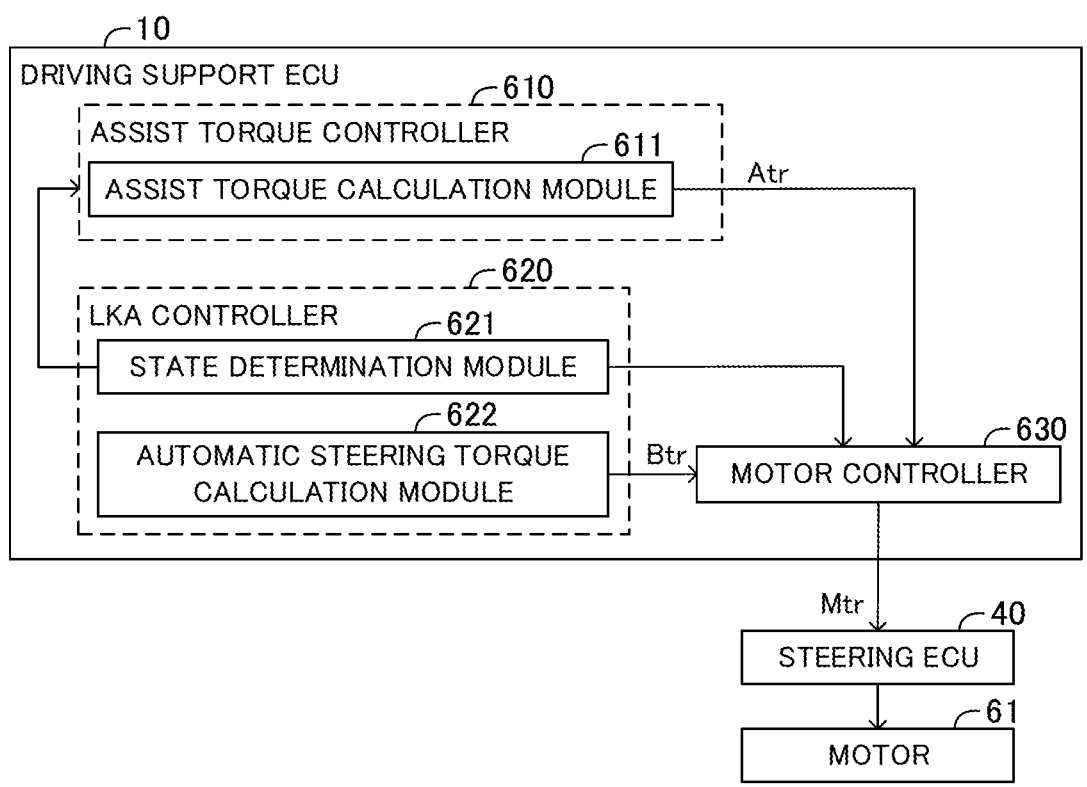
FIG. 6 is a functional block diagram of a driving support ECU illustrated in FIG. 1.

More specifically, as illustrated in FIG. 6, the ECU 10 includes, as functional modules/elements, an assist torque controller 610, an LKA controller 620, and a motor controller 630. The assist torque controller 610 includes an assist torque calculation module 611. Further, the LKA controller 620 includes a state determination module 621, and an automatic steering torque calculation module 622.

Figure 7:
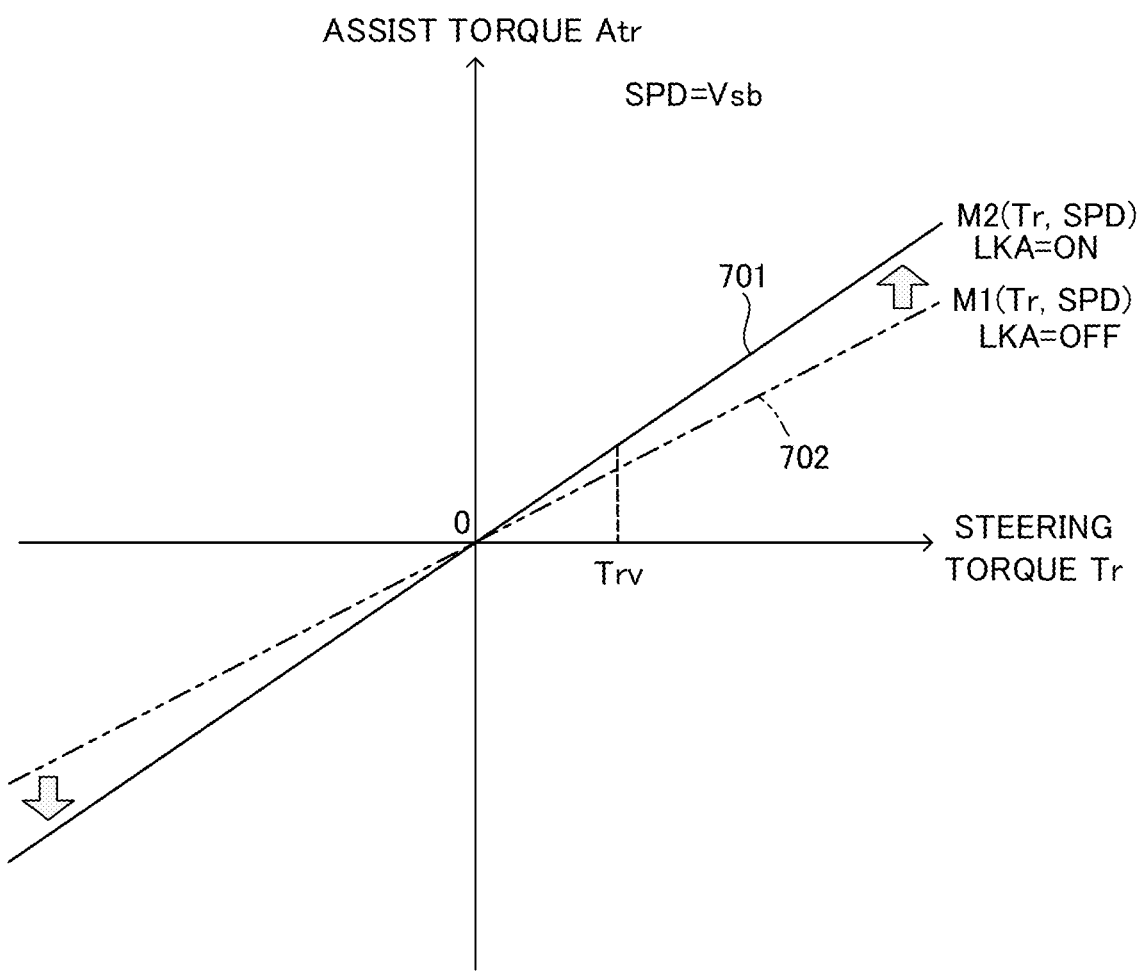
FIG. 7 is a diagram for illustrating a second map M2 representing a relationship between the steering torque Tr, the vehicle speed SPD, and the assist torque Atr.

In the first period, the assist torque calculation module 611 obtains the assist torque Atr by using a second map M2 (Tr, SPD) shown by a solid line 701 in FIG. 7 in place of the first map M1. The assist torque calculation module 611 outputs the assist torque Atr to the motor controller 630. To simplify the explanation, only the second map M2 used when the vehicle speed SPD is "Vsb" is illustrated in FIG. 7. Also in FIG. 7, the first map M1 used when the vehicle speed SPD is "Vsb" is illustrated by an alternate long and two short dashes line 702.

In the second map M2, the larger the magnitude |Tr| of the steering torque Tr, the larger the magnitude |Atr| of the assist torque Atr. Further, the higher the vehicle speed SPD, the smaller the magnitude |Atr| of the assist torque Atr.

It is assumed that the vehicle speed SPD is Vsb. As can be understood from the comparison between the lines 701 and 702, when the steering torque Tr is a value (for example, Trv), the magnitude of the assist torque Atr obtained from the second map M2 becomes larger than the magnitude of the assist torque Atr obtained from the first map M1. That is, for the steering torque Tr having the same magnitude, the magnitude of the assist torque Atr in the first period is larger than the magnitude of the assist torque Atr of the case in which the operation state of the LKA is the off state. According to the second map M2, such an effect can be obtained even when the vehicle speed SPD is a value other than Vsb.

The state determination module 621 outputs an operation state signal to the assist torque controller 610 and the motor controller 630. The operation state signal is a signal indicating whether the operation state of the LKA is the on state or the off state. The operation state signal corresponds to information on a value of an LKA execution flag X1 described later.

Further, in the case in which the operation state of the LKA is the on state, the state determination module 621 determines whether the driving operation switching request is issued. When the driving operation switching request is issued, the state determination module 621 outputs a driving operation switching request signal to the assist torque controller 610 and the motor controller 630. The driving operation switching request signal herein is a signal indicating whether the driving operation switching request is issued. This signal includes information on a value of a transition flag X2 described later and information on the type of the driving operation switching request (the first request or the second request).

The automatic steering torque calculation module 622 operates only in the case in which the operation state of the LKA is the on state. The automatic steering torque calculation module 622 calculates the automatic steering torque Btr by using the LKA control parameters (CL, dL, and θL) as described above. The automatic steering torque calculation module 622 outputs the automatic steering torque Btr to the motor controller 630.

The motor controller 630 obtains a motor control amount Mtr according to Expression (1) described below. The motor control amount Mtr is a torque to be generated in the motor 61. The motor controller 630 calculates, as the motor control amount Mtr, a sum of the assist torque Atr which is the first control amount, and the automatic steering torque Btr which is the second control amount.

$$Mtr = Atr + Btr \quad (1)$$

The motor controller 630 outputs the motor control amount Mtr to the steering ECU 40. The steering ECU 40 controls the motor 61 to cause the motor 61 to generate the torque corresponding to the motor control amount Mtr.

As described above, the motor control amount Mtr is calculated by using the assist torque Atr obtained from the second map M2. Therefore, even in the situation in which the operation state of the LKA is the on state, the driver can steer the steering wheel SW without feeling a large load.

Figure 8:
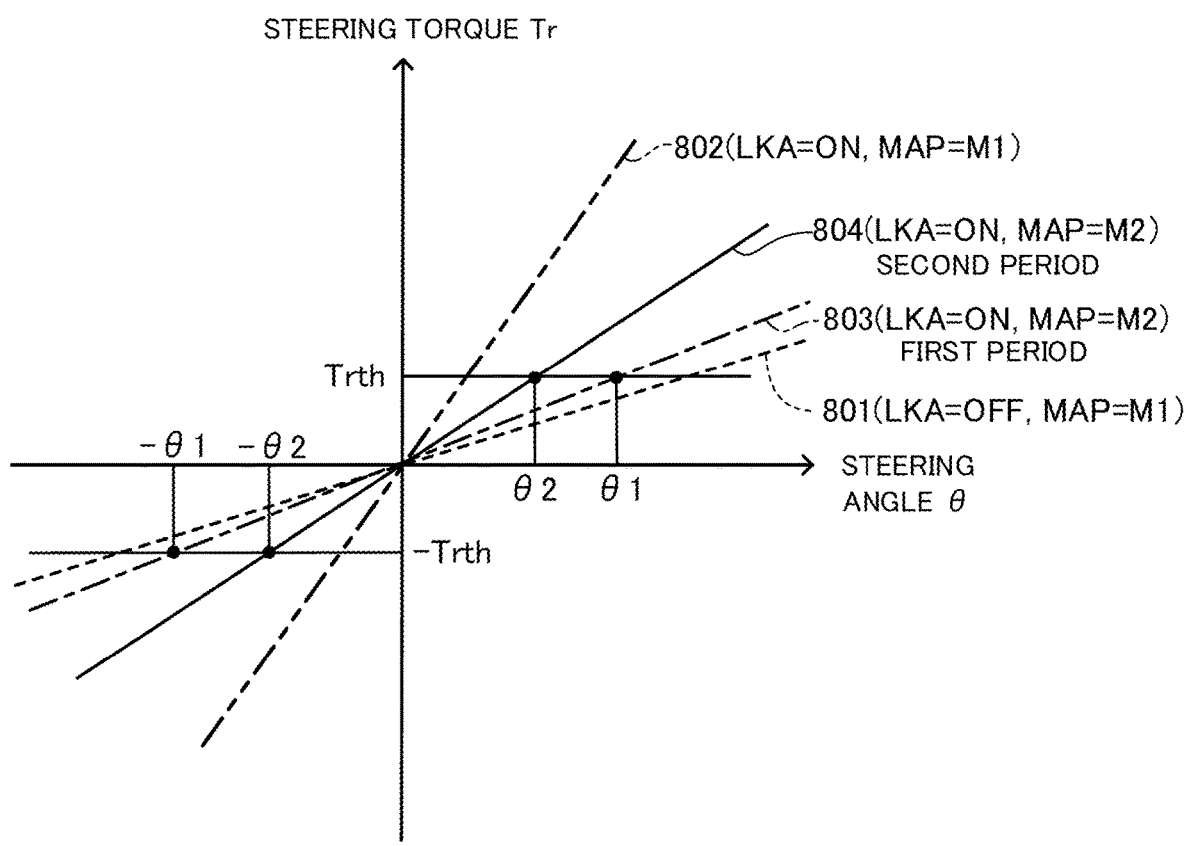
FIG. 8 is a diagram for illustrating a relationship between a steering angle θ of a steering wheel SW and the steering torque Tr.

FIG. 8 illustrates a "relationship between the steering angle θ and the steering torque Tr" when the driver operates the steering wheel SW in a situation in which the host vehicle 100 travels straight. Lines 802, 803 and 804 show relationships between θ and Tr in a situation in which the host vehicle 100 travels along the target travel line TL (target travel line extending in a straight direction), respectively.

The broken line 801 represents the relationship between θ and Tr in the case in which the operation state of the LKA is the off state. The alternate long and two short dashes line 802 represents the relationship between θ and Tr when it is assumed that the assist torque Atr is calculated using the first map M1 in the case in which the operation state of the LKA is the on state. The alternate long and short dash line 803 represents the relationship between θ and Tr in the first period (that is, when the assist torque Atr is calculated using the second map M2 in the case in which the operation state of the LKA is the on state).

As can be understood from FIG. 8, the line 802 deviates greatly from the line 801. On the other hand, the line 803 is close to the line 801. That is, the ECU 10 calculates the assist torque Atr using the second map M2 instead of the first map M1 in the first period, and therefore, the magnitude |Atr| of the assist torque Atr becomes relatively large in the first period. This enables to reduce the load felt by the driver when operating the steering wheel SW. As a result, in the case in which the operation state of the LKA is the on state, the driver can operate the steering wheel SW with a feeling similar to that of the case in which the operation state of the LKA is the off state.

(2) Second Period

In the second period, the ECU 10 determines whether the magnitude |Tr| of the steering torque Tr reaches the torque threshold Trth to thereby determine whether the driver is in the manual operation possible state. This is because it is better to switch the steering control from the LKA to the manual operation by the driver in the case in which the driver is in the manual operation possible state. However, as shown by the line 803, if the assist torque Atr is calculated using the second map M2 in the second period as in the first period, the magnitude of the steering angle θ is relatively large (see θ1) at a time point at which the magnitude Fri of the steering torque Tr reaches the torque threshold Trth. That is, in the case in which the driver attempts to indicate to the ECU 10 that he/she is in the manual operation possible state, the driver has to operate/rotate the steering wheel SW greatly. As a result, the vehicle moves laterally largely.

In view of the above, in the second period, the motor controller 630 executes correction processing for changing a proportion P1 of the assist torque Atr in the motor control amount Mtr according to Expression (2) described below. In other words, the above-mentioned proportion P1 is a degree of influence of the assist torque Atr on the motor control amount Mtr. Hereinafter, the proportion P1 will be referred to as "first proportion P1". Further, the correction processing in this example will be referred to as "first correction processing". In Expression (2), it should be noted that 0<α<1.

$$Mtr = \alpha \cdot Atr + (2-\alpha) \cdot Btr \quad (2)$$

According to Expression (2), the ratio between the assist torque Atr and the automatic steering torque Btr in the motor control amount Mtr is changed.

It is assumed that the host vehicle travels at a speed (for example, Vsb). According to the first correction processing, for the steering torque Tr having the same magnitude, the first proportion P1 in the second period becomes smaller than the first proportion P1 in the first period. That is, the degree of influence of the assist torque Atr on the motor control amount Mtr in the second period is smaller than that in the first period.

The solid line 804 in FIG. 8 represents the relationship between θ and Tr in the second period. The line 804 is closer to the line 802 than the line 803. This is because, in the case in which the driver inputs the steering torque Tr having the same magnitude in each of the first period and the second period, the magnitude |θ| of the steering angle θ in the second period becomes smaller than the magnitude |θ| of the steering angle θ in the first period. As a result, as shown in FIG. 8, the magnitude of the steering angle θ when the magnitude |Tr| of the steering torque Tr reaches the torque threshold Trth in the second period becomes θ2, which is smaller than θ1. In other words, when the driver attempts to indicate to the ECU 10 that he/she is in the manual operation possible state in the second period, the driver does not have to operate the steering wheel SW largely (that is, the driver only has to change/rotate the steering wheel SW by a small angle). Therefore, the amount of lateral movement of the vehicle can be reduced. Hereinafter, the amount of change in the steering angle θ of the steering wheel SW required for the magnitude |Tr| of the steering torque Tr to reach the torque threshold Trth will be referred to as "specific steering amount".

(Operation)

Next, the operation of the CPU of the ECU 10 (hereinafter simply referred to as "CPU") will be described. In the situation in which the operation state of the ACC is set to the on state in response to the operation on the operation switch 18, the CPU is configured to perform the ACC by executing a routine (not shown). Further, the CPU is configured to execute an "LKA start/termination determination routine" illustrated in FIG. 9 every time a predetermined time elapses during the performance of the ACC.

Further, every time the predetermined time elapses, the CPU executes a routine (not shown) to acquire the detection signals or output signals from the various sensors 11 to 17 and the operation switch 18, and stores those detection signals or output signals in the RAM.

Figure 9:
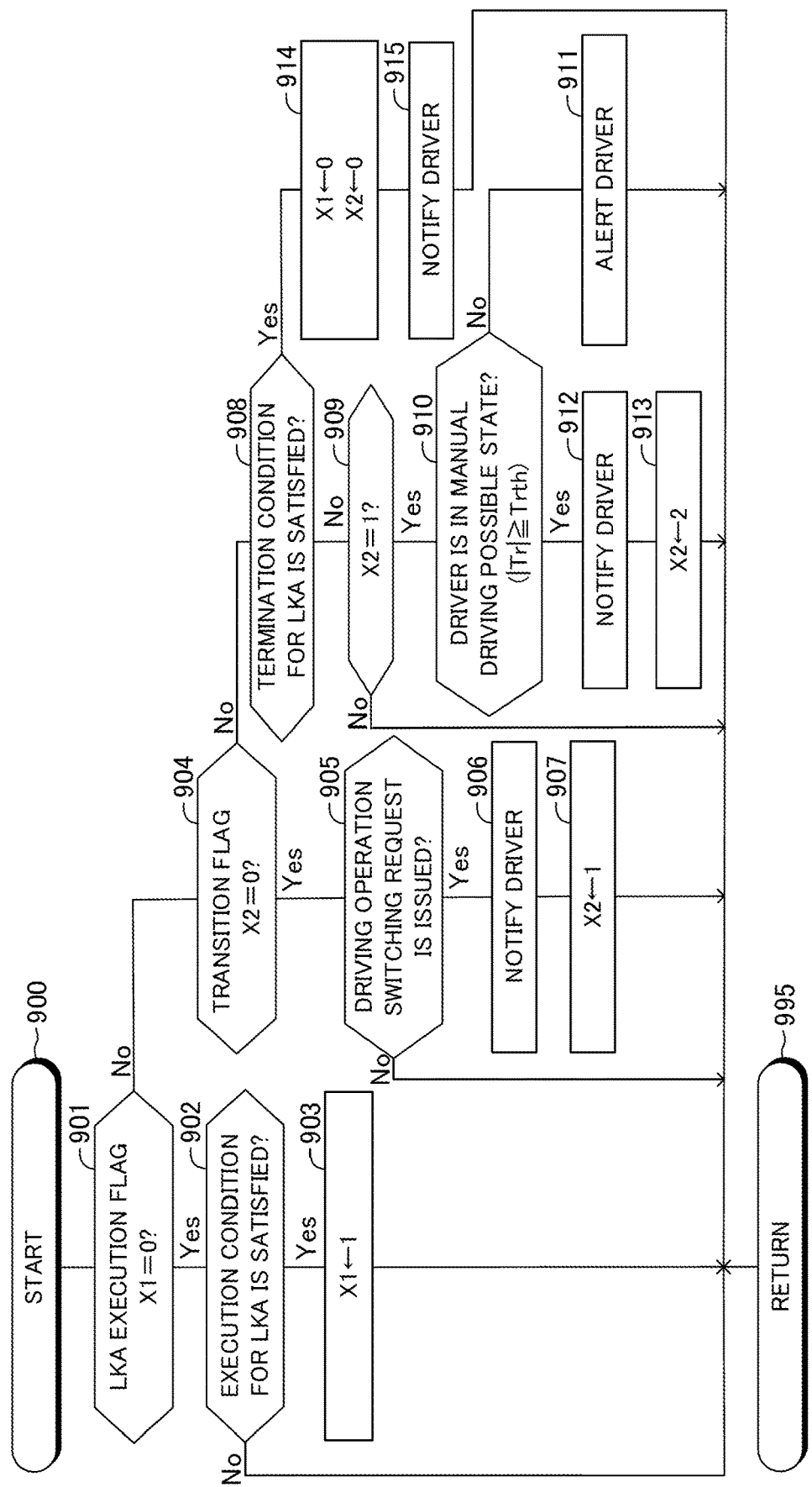
FIG. 9 is a flowchart for illustrating an "LKA start/termination determination routine" to be executed by the driving support ECU according to the first embodiment.

When a predetermined timing has come, the CPU starts the process from Step 900 of FIG. 9, and proceeds to Step 901 to determine whether the value of the LKA execution flag X1 is "0". Hereinafter, the LKA execution flag X1 will be simply referred to as "execution flag X1". When the value of the execution flag X1 is "1", this indicates that the operation state of the LKA is the on state. When the value of the execution flag X1 is "0", this indicates that the operation state of the LKA is the off state. The execution flag X1 and another flag (transition flag X2) described later are set to "0" in an initialization routine to be executed by the CPU when a position of an ignition switch (not shown) is changed from an off position to an on position.

When it is now assumed that the operation state of the LKA is the off state, the value of the execution flag X1 is "0". In this case, the CPU makes a "Yes" determination in Step 901, and proceeds to Step 902 to determine whether an execution condition for the LKA is satisfied.

The execution condition is satisfied when both of conditions 1 and 2 described below are satisfied. At least one other condition may be added as the execution condition for the LKA. The same applies to other conditions described below.

(Condition 1): The operation state of the LKA is set to the on state by operating the operation switch 70.
(Condition 2): The CPU has detected (i) the left lane line LL and the right lane line RL from the host vehicle 100 to a position far away, or (ii) the preceding vehicle (following target vehicle) in the front region of the host vehicle 100.

When the execution condition is not satisfied, the CPU makes a "No" determination in Step 902, and proceeds directly to Step 995 to end the current execution of the present routine.

On the other hand, when the execution condition is satisfied, the CPU makes a "Yes" determination in Step 902, and proceeds to Step 903 to set the value of the execution flag X1 to "1". Thereafter, the CPU proceeds to Step 995 to end the current execution of the present routine. Thus, since the CPU makes a "Yes" determination in Step 1101 of FIG. 11 as described later, the LKA is started. That is, the operation state of the LKA is changed from the off state to the on state.

After the LKA is started, the CPU again starts the routine of FIG. 9 from Step 900. The CPU makes a "No" determination in Step 901, and proceeds to Step 904. In Step 904, the CPU determines whether the value of the transition flag X2 is "0". When the value of the transition flag X2 is "1", this indicates that the present time is in the second period (transition period). When the value of the transition flag X2 is "2", this indicates that it is already determined in the second period that the driver is in the manual driving possible state.

It is assumed that the present time is in the first period (that is, the driving operation switching request is not yet issued). In this case, the value of the transition flag X2 is "0". Thus, the CPU makes a "Yes" determination in Step 904, and proceeds to Step 905 to determine whether the driving operation switching request is issued. That is, the CPU determines whether any one of the first request and the second request is issued. As described above, the first request is a request for changing the operation state of the LKA from the on state to the off state in response to the operation on the operation switch 18, and the second request is a request for changing the operation state of the LKA from the on state to the off state due to the LKA system abnormality. When the driving operation switching request is not yet issued, the CPU makes a "No" determination in Step 905, and proceeds directly to Step 995 to end the current execution of the present routine.

On the other hand, when the driving operation switching request is issued, the CPU makes a "Yes" determination in Step 905, and sequentially executes the processing of Steps 906 and 907 which are described below. Thereafter, the CPU proceeds to Step 995 to end the current execution of the present routine.

Step 906: The CPU controls the meter ECU 50 to display on the display 51 a message that it enters the transition period for changing the operation state of the LKA from the on state to the off state. Further, the CPU controls the meter ECU 50 to cause the speaker 52 to utter the message.

Step 907: The CPU sets the value of the transition flag X2 to "1" to thereby indicate that the present time is during the second period.

Thereafter, the CPU again starts the routine of FIG. 9 from Step 900. The CPU makes a "No" determination in Step 901, makes a "No" determination in Step 904, and proceeds to Step 908. In Step 908, the CPU determines whether a termination condition for the LKA is satisfied. The termination condition is satisfied when the elapsed time Tep since the driving operation switching request is issued (that is, elapsed time since the transition flag X2 is set to "1") has reached the time threshold Tmth. The time threshold Tmth is set to a time longer than the time required for the driver to operate the steering wheel SW to indicate that he/she is in the manual operation possible state after the driver receives the notification by the processing of Step 906.

It is assumed that the present time is immediately after the value of the transition flag X2 is set to "1". In this case, the termination condition is not satisfied. The CPU makes a "No" determination in Step 908, and proceeds to Step 909. In Step 909, the CPU determines whether the value of the transition flag X2 is "1". Since the value of the transition flag X2 is "1" at present, the CPU makes a "Yes" determination in Step 909, and proceeds to Step 910 to determine whether the driver is in the manual driving possible state. Specifically, the CPU determines whether the magnitude Fri of the steering torque Tr becomes equal to or larger than the torque threshold Trth.

The driver normally does not operate the steering wheel SW during the performance of the LKA. In many cases, the magnitude Fri of the steering torque Tr is smaller than the torque threshold Trth at the start of the second period. Thus, the CPU makes a "No" determination in Step 910, and proceeds to Step 911 to display on the display 51 an alert message urging the driver to operate the steering wheel SW. Further, the CPU causes the speaker 52 to output the alert message. Thereafter, the CPU proceeds to Step 995 to end the current execution of the present routine. In this manner, the CPU can urge the driver to operate the steering wheel SW in the case in which the magnitude |Tr| of the steering torque Tr has not yet reached the torque threshold Trth.

It is assumed that the driver operates the steering wheel SW, and therefore, the magnitude |Tr| of the steering torque Tr has become equal to or larger than the torque threshold Trth. In this case, when the CPU proceeds to Step 910 via Steps 901, 904, 908 and 909, the CPU makes a "Yes" determination. Next, the CPU sequentially executes the processing of Steps 912 and 913 which are described below. Thereafter, the CPU proceeds to Step 995 to end the current execution of the present routine.

Step 912: The CPU controls the meter ECU 50 to display on the display 51 a message that the CPU has recognized the operation on the steering wheel SW (that is, the operation by the driver for indicating that he/she is in the manual driving possible state). Further, the CPU controls the meter ECU 50 to cause the speaker 52 to utter the message.

Step 913: the CPU sets the value of the transition flag X2 to "2" to thereby indicate that the driver has become in the manual driving possible state in the second period.

Therefore, when the CPU next proceeds to Step 909, the CPU makes a "No" determination, and proceeds directly to Step 995 to end the current execution of the present routine.

The elapsed time Tep has reached the time threshold Tmth while the above-described processing is repeatedly executed. That is, the termination condition is satisfied. In this case, when the CPU proceeds to Step 908, the CPU makes a "Yes" determination, and sequentially executes the processing of Steps 914 and 915 which are described below. Thereafter, the CPU proceeds to Step 995 to end the current execution of the present routine.

Step 914: The CPU sets the value of the execution flag X1 to "0", and sets the value of the transition flag X2 to "0".

Step 915: The CPU controls the meter ECU 50 to display on the display 51 a message informing that the operation state of the LKA is changed to the off state. Further, the CPU controls the meter ECU 50 to cause the speaker 52 to utter the message.

Therefore, since the CPU makes a "No" determination in Step 1101 of FIG. 11 as described later, the LKA is terminated (that is, the operation state of the LKA becomes the off state).

Figure 10:
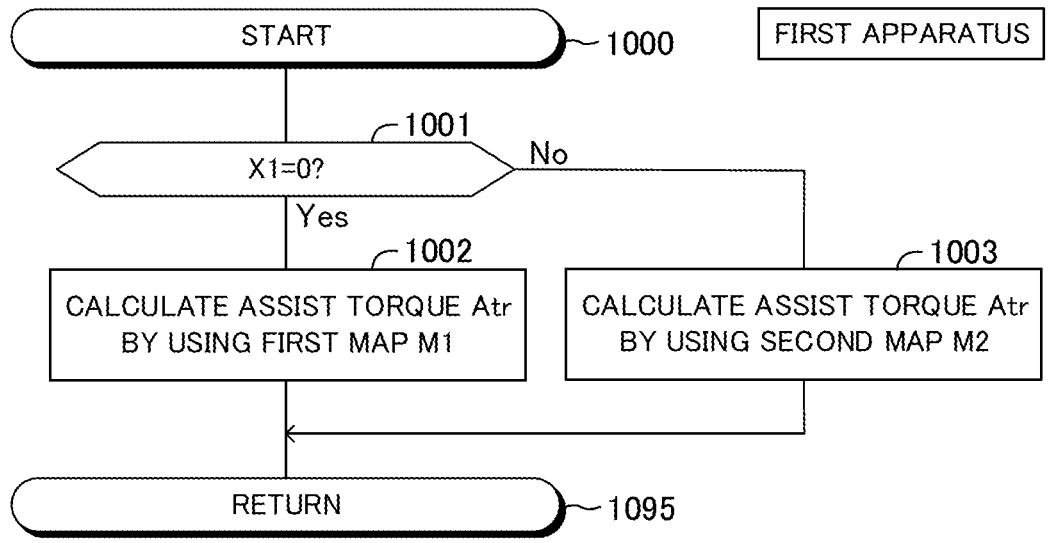
FIG. 10 is a flowchart for illustrating a "first control amount calculation routine" to be executed by the driving support ECU according to the first embodiment.

Further, the CPU is configured to execute a "first control amount calculation routine" illustrated in FIG. 10 every time the predetermined time elapses. When a predetermined timing has come, the CPU starts the process from Step 1000 of FIG. 10, and proceeds to Step 1001 to determine whether the value of the execution flag X1 is "0".

When the value of the execution flag X1 is "0", the CPU makes a "Yes" determination in Step 1001, and proceeds to Step 1002. In Step 1002, the CPU applies the steering torque Tr and the vehicle speed SPD to the first map M1 to obtain the assist torque Atr as the first control amount. Thereafter, the CPU proceeds to Step 1095 to end the current execution of the present routine.

On the other hand, when the value of the execution flag X1 is "1", the CPU makes a "No" determination in Step 1001, and proceeds to Step 1003. In Step 1003, the CPU applies the steering torque Tr and the vehicle speed SPD to the second map M2 to obtain the assist torque Atr as the first control amount. Thereafter, the CPU proceeds to Step 1095 to end the current execution of the present routine.

Figure 11:
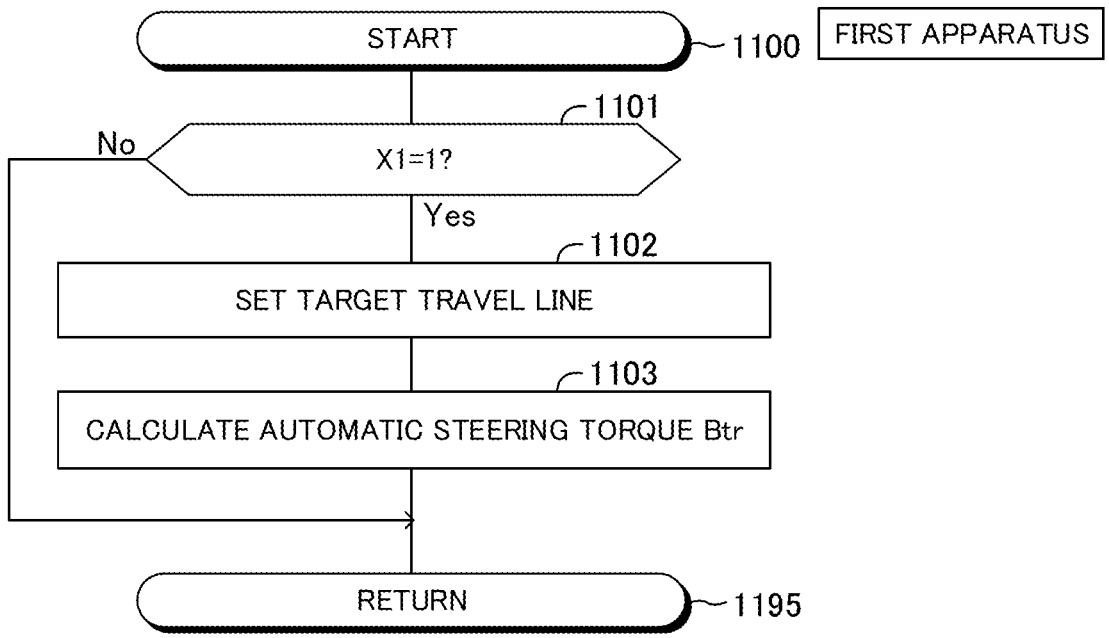
FIG. 11 is a flowchart for illustrating a "second control amount calculation routine" to be executed by the driving support ECU according to the first embodiment.

Further, the CPU is configured to execute a "second control amount calculation routine" illustrated in FIG. 11 every time the predetermined time elapses. When a predetermined timing has come, the CPU starts the process from Step 1100 of FIG. 11, and proceeds to Step 1101 to determine whether the value of the execution flag X1 is "1".

When the value of the execution flag X1 is not "1", the CPU makes a "No" determination in Step 1101, and proceeds directly to Step 1195 to end the current execution of the present routine.

On the other hand, when the value of the execution flag X1 is "1", the CPU makes a "Yes" determination in Step 1101, and sequentially executes the processing of Steps 1102 and 1103 which are described below. Thereafter, the CPU proceeds to Step 1195 to end the current execution of the present routine.

Step 1102: The CPU sets, as the target travel line TL, one of the center line LM, the preceding-vehicle trajectory L1 and the corrected preceding-vehicle trajectory L2 in accordance with the detection situation of the preceding vehicle and the detection situation of the lane lines LL and RL.

Step 1103: The CPU obtains, as the second control amount, the automatic steering torque Btr for causing the host vehicle 100 to travel along the target travel line TL as described above.

Figure 12:
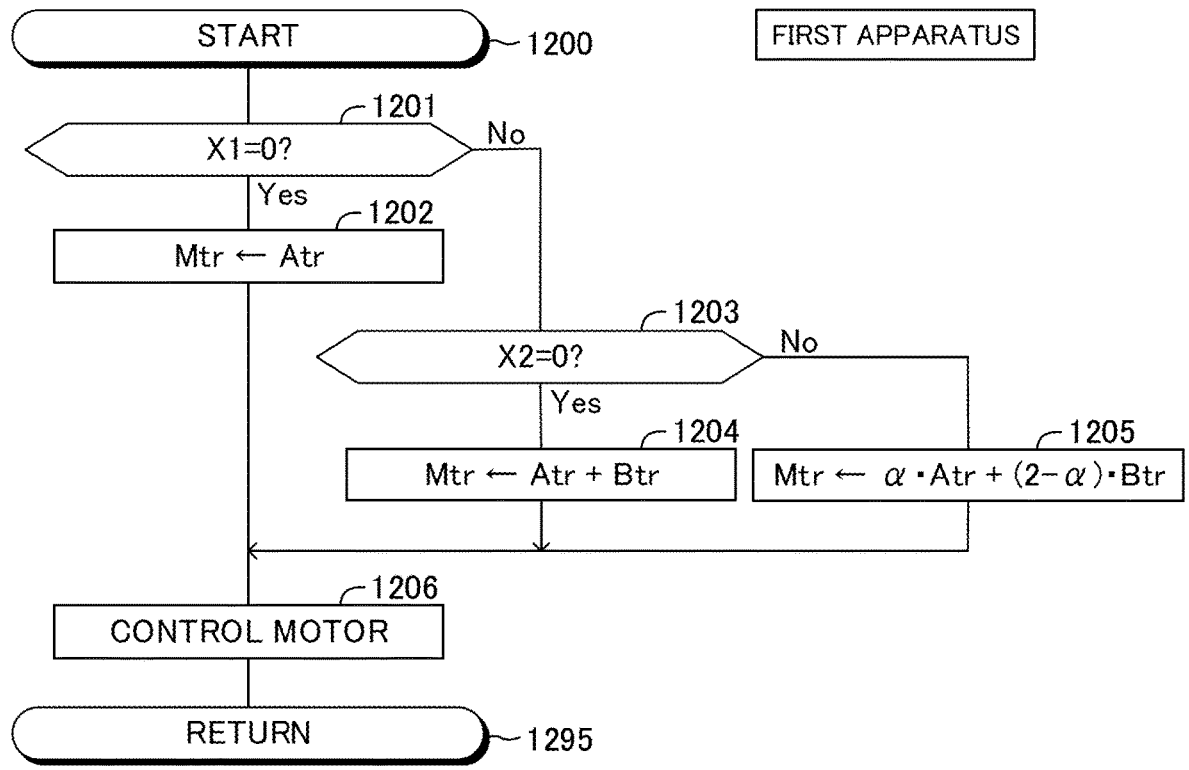
FIG. 12 is a flowchart for illustrating a "motor control routine" to be executed by the driving support ECU according to the first embodiment.

Further, the CPU is configured to execute a "motor control routine" illustrated in FIG. 12 every time the predetermined time elapses. When a predetermined timing has come, the CPU starts the process from Step 1200 of FIG. 12, and proceeds to Step 1201 to determine whether the value of the execution flag X1 is "0".

When the value of the execution flag X1 is "0", the CPU makes a "Yes" determination in Step 1201, and proceeds to Step 1202 to set the assist torque Atr as the motor control amount Mtr. Next, in Step 1206, the CPU controls the motor 61 based on the motor control amount Mtr. The CPU controls the motor 61 by using the steering ECU 40 such that the actual torque generated by the motor 61 matches (becomes equal to) the motor control amount Mtr. Thereafter, the CPU proceeds to Step 1295 to end the current execution of the present routine.

On the other hand, when the value of the execution flag X1 is not "0", the CPU makes a "No" determination in Step 1201, and proceeds to Step 1203 to determine whether the value of the transition flag X2 is "0". When the value of the transition flag X2 is "0", this indicates that the present time is during the first period. In this case, the CPU makes a "Yes" determination in Step 1203, and proceeds to Step 1204 to calculate the motor control amount Mtr according to Expression (1). Next, in Step 1206, the CPU controls the motor 61 based on the motor control amount Mtr as described above. Thereafter, the CPU proceeds to Step 1295 to end the current execution of the present routine.

When the value of the transition flag X2 is not "0" (that is, the value of the transition flag X2 is "1" or "2") in Step 1203, this indicates that the present time is during the second period (transition period). Therefore, the CPU makes a "No" determination in Step 1203, and proceeds to Step 1205 to execute the first correction processing. Specifically, the CPU calculates the motor control amount Mtr according to Expression (2). Next, in Step 1206, the CPU controls the motor 61 based on the motor control amount Mtr as described above. Thereafter, the CPU proceeds to Step 1295 to end the current execution of the present routine.

According to the above-described configuration, the vehicle control apparatus calculates the motor control amount Mtr in the first period such that the magnitude |Tr| of the steering torque Tr reaches the torque threshold Trth when the driver changes the magnitude |θ| of the steering angle θ of the steering wheel SW by a first angle (for example, θ1). Meanwhile, the vehicle control apparatus calculates the motor control amount Mtr in the second period such that the magnitude |Tr| of the steering torque Tr reaches the torque threshold Trth when the driver changes the magnitude |θ| of the steering angle θ of the steering wheel SW by a second angle (for example, θ2). The second angle θ2 is smaller than the first angle θ1. In this manner, the specific steering amount (θ2) in the second period is smaller than the specific steering amount (θ1) in the first period (see FIG. 8). Therefore, in the second period, it is possible to reduce the angle of change of the steering wheel SW (that is, change amount of the steering angle θ) required to indicate to the vehicle control apparatus that the driver has become in the manual operation possible state. The driver can indicate to the vehicle control apparatus that he/she has become the manual operation possible state without increasing the lateral movement amount of the vehicle.

The first apparatus executes the first correction processing such that, for the steering torque Tr having the same magnitude, the first proportion P1 in the second period becomes smaller than the first proportion P1 in the first period. The first apparatus changes the first proportion P1 in this manner to thereby make the specific steering amount in the second period smaller than the specific steering amount in the first period.

Further, the first apparatus continues the LKA until the elapsed time Tep reaches the time threshold Tmth without immediately terminating the LKA at the time when it is determined that the driver is in the manual operation possible state in the second period. The first apparatus switches the operation state of the LKA from the on state to the off state after the elapsed time Tep reaches the time threshold Tmth. For example, it is assumed that the operation state of the LKA is switched to the off state at the time point at which the driver is determined to be in the manual operation possible state. In this case, the first correction processing is terminated in the situation in which the driver is operating the steering wheel SW. The load on the steering wheel SW is sharply reduced during the operation of the steering wheel SW. The steering angle θ of the steering wheel SW becomes large, and therefore, the lateral movement amount of the vehicle may become large. According to the above configuration, the load on the steering wheel SW is not changed at the time point at which the driver is determined to be in the manual operation possible state. Therefore, it is possible to reduce the possibility that the lateral movement amount of the vehicle becomes large.

Modification Example 1 of the First Apparatus

The motor controller 630 may execute the first correction processing according to Expression 3 described below.

$$Mtr = \alpha Atr + Btr \quad (3)$$

Modification Example 2 of the First Apparatus

The first correction processing may be processing such that the magnitude of the automatic steering torque Btr in the second period becomes larger than the magnitude of the automatic steering torque Btr in the first period. The motor controller 630 may execute the first correction processing according to Expression 4 described below. Here, β>1.

$$Mtr = Atr + \beta Btr \quad (4)$$

Modification Example 3 of the First Apparatus

Figure 13:
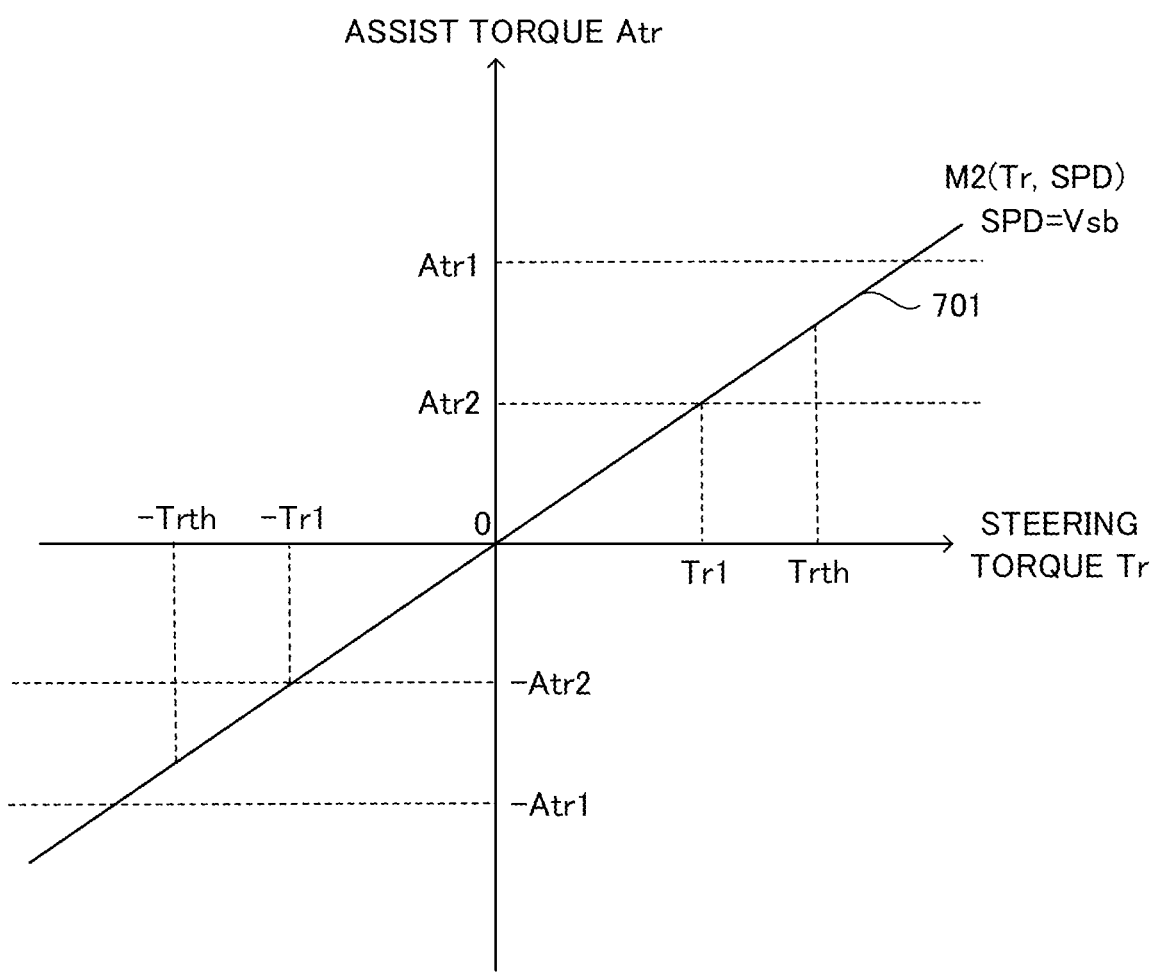
FIG. 13 is a diagram for illustrating a relationship between an upper limit value and the second map M2 according to a modification example of the first embodiment.

An upper limit value (hereinafter, referred to as "first upper limit value") may be set for the magnitude (absolute value) of the assist torque Atr. In this configuration, the first correction processing may be processing for setting the first upper limit value in the second period to be smaller than the first upper limit value in the first period. For example, the case in which the steering torque Tr is a positive value will be described. As illustrated in FIG. 13, in the first period, the assist torque calculation module 611 sets "Atr1" as the first upper limit value. In the first period, the assist torque calculation module 611 limits the magnitude of the assist torque Atr by Atr1 to thereby obtain the assist torque Atr. Further, in the second period, the assist torque calculation module 611 sets "Atr2" as the first upper limit value. In the second period, the assist torque calculation module 611 limits the magnitude of the assist torque Atr by Atr2 to thereby obtain the assist torque Atr. Atr2 is smaller than Atr1. Further, in the second map M2, the steering torque Tr1 at which the assist torque Atr2 is obtained is smaller than the torque threshold Trth. According to this configuration, when the driver inputs the steering torque Tr having a magnitude equal to or larger than the torque threshold Trth to the steering wheel SW in the second period, the assist torque Atr is limited by the first upper limit value Atr2. As a result, the specific steering amount in the second period becomes smaller than the specific steering amount in the first period.

Modification Example 4 of the First Apparatus

An upper limit value (hereinafter, referred to as "second upper limit value") may be set for the magnitude (absolute value) of the automatic steering torque Btr. In this configuration, the first correction processing may be processing for setting the second upper limit value in the second period to be larger than the second upper limit value in the first period. In the first period, the automatic steering torque calculation module 622 sets "Btr1" as the second upper limit value. In the first period, the automatic steering torque calculation module 622 limits the magnitude of the automatic steering torque Btr by Btr1 to thereby obtain the automatic steering torque Btr. Further, in the second period, the automatic steering torque calculation module 622 sets "Btr2" as the second upper limit value. In the second period, the automatic steering torque calculation module 622 limits the magnitude of the automatic steering torque Btr by Btr2 to thereby obtain the automatic steering torque Btr. Btr2 is larger than Btr1. According to this configuration, the magnitude of the automatic steering torque Btr in the second period becomes larger than the magnitude of the automatic steering torque Btr in the first period. As a result, the specific steering amount in the second period becomes smaller than the specific steering amount in the first period.

Modification Example 5 of the First Apparatus

In the situation in which the operation state of the LKA is the on state, the assist torque calculation module 611 may obtain the assist torque Atr by using the first map M1 in place of the second map M2. In this configuration, in the first period, the motor controller 630 may obtain the motor control amount Mtr according to Expression 5 described below. Here, $0<\gamma<1$.

$$Mtr=Atr+\gamma Btr \quad (5)$$

Further, in the second period, the motor controller 630 may obtain the motor control amount Mtr according to Expression 6 described below. Here, $0<\gamma\leq\delta 6\ 1$.

$$Mtr=Atr+\delta Btr \quad (6)$$

According to this configuration, the magnitude of the automatic steering torque Btr in the second period becomes larger than the magnitude of the automatic steering torque Btr in the first period. As a result, the specific steering amount in the second period becomes smaller than the specific steering amount in the first period.

Modification Example 6 of the First Apparatus

In the case in which the driver is in the manual operation possible state in the second period, the vehicle control apparatus may switch the operation state of the LKA from the on state to the off state at the earlier of a first time point and a second time point. The first time point is the time point at which the elapsed time Tep reaches the time threshold Tmth. The second time point is the time point at which a predetermined time Twth has elapsed since the driver is determined to be in the manual operation possible state. Therefore, after the driver becomes the manual operation possible state in the second period, it is possible to switch the steering control from the LKA to the driver more quickly.

Modification Example 7 of the First Apparatus

In the case in which the magnitude |Tr| of the steering torque Tr becomes equal to or less than a predetermined positive threshold Tr_off during the period from the time point at which the driver is determined to be in the manual operation possible state to the end time point of the second period, the vehicle control apparatus may switch the operation state of the LKA from the on state to the off state. According to this configuration, it is possible to switch the steering control from the LKA to the driver before the elapsed time Tep reaches the time threshold Tmth, without increasing the lateral movement amount of the vehicle.

Modification Example 8 of the First Apparatus

In the second period, the ECU 10 may obtain the assist torque Atr by using a map Mc (Tr, SPD) for the transition period in place of the second map M2. The map Mc (Tr, SPD) is defined such that, for the combination of the vehicle speed SPD and the steering torque Tr, the assist torque Atr smaller than the second map M2 and larger than the first map M1 can be obtained. In this configuration, the ECU 10 calculates the motor control amount Mtr in the second period according to Expression (1). According to this configuration, the same effect as the first correction processing can be provided.

Second Embodiment

Figure 14:
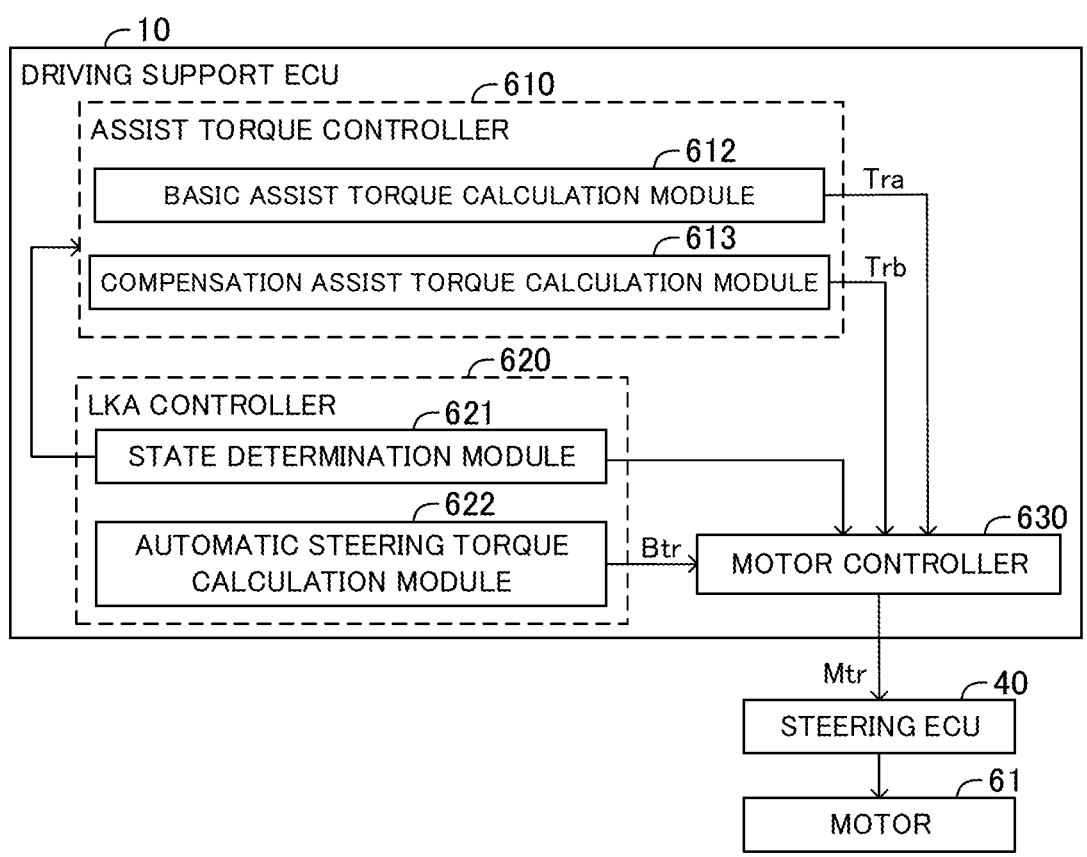
FIG. 14 is a functional block diagram of the driving support ECU according to a second embodiment.

Next, a vehicle control apparatus (hereinafter referred to as "second apparatus") according to a second embodiment will be described. In the second apparatus, as illustrated in FIG. 14, the ECU 10 includes, as functional modules/elements, the assist torque controller 610, the LKA controller 620, and the motor controller 630. In FIG. 14, the same elements as those shown in FIG. 6 are designated by the same reference numerals of FIG. 6. Therefore, a detailed description is omitted for the elements indicated by the same reference numerals as those of FIG. 6.

The assist torque controller 610 includes a basic assist torque calculation module 612, and a compensation assist torque calculation module 613. The basic assist torque calculation module 612 applies the steering torque Tr and the vehicle speed SPD to the first map M1 to obtain a basic assist torque Tra. The basic assist torque calculation module 612 outputs the basic assist torque Tra to the motor controller 630.

Figure 15:
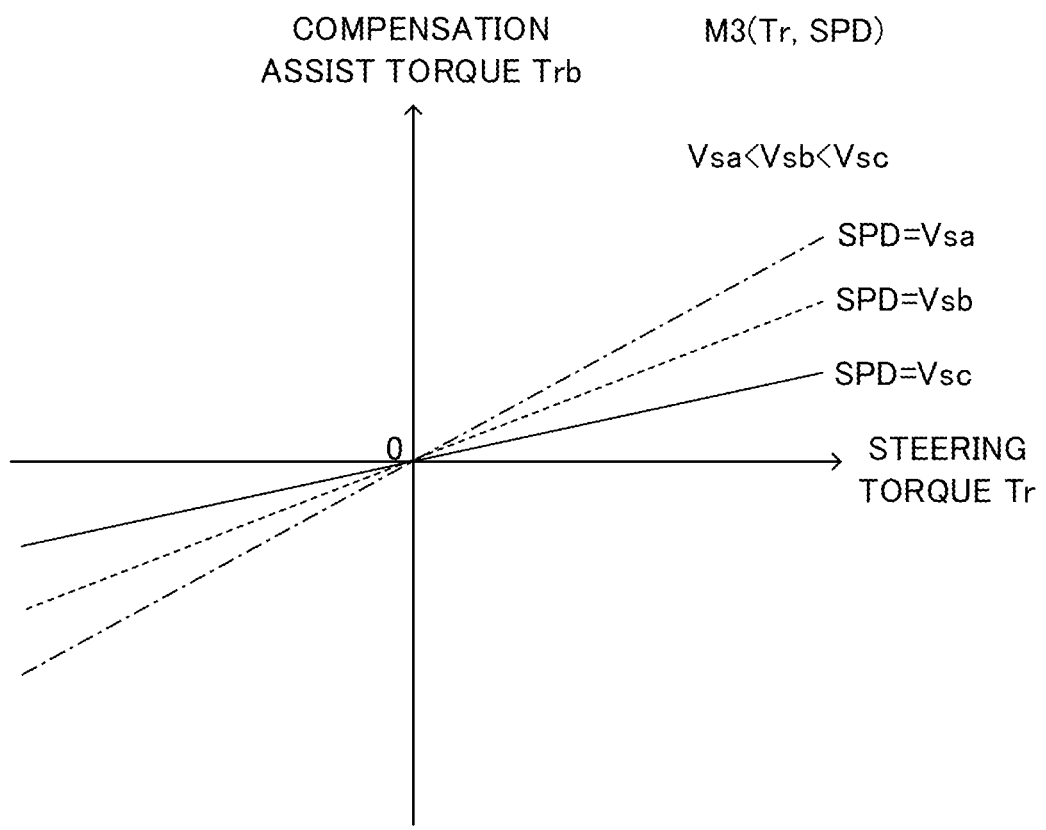
FIG. 15 is a diagram for illustrating a third map M3 representing a relationship between the steering torque Tr, the vehicle speed SPD, and a compensation assist torque Trb according to the second embodiment.

The compensation assist torque calculation module 613 operates only in the case in which the operation state of the LKA is the on state. The compensation assist torque calculation module 613 receives the operation state signal from the state determination module 621. In the case in which the operation state of the LKA is the on state, the compensation assist torque calculation module 613 applies the steering torque Tr and the vehicle speed SPD to a third map M3 (Tr, SPD) illustrated in FIG. 15 to obtain a compensation assist torque Trb. The compensation assist torque Trb is a torque for compensating at least a part of the basic assist torque Tra that is canceled by the automatic steering torque Btr in the case in which the operation state of the LKA is the on state. According to the third map M3, the larger the magnitude |Tr| of the steering torque Tr, the larger the magnitude |Trb| of the compensation assist torque Trb. Further, the lower the vehicle speed SPD, the larger the magnitude of the compensation assist torque Trb.

In the case in which the operation state of the LKA is the on state, the motor controller 630 obtains the motor control amount Mtr based on the basic assist torque Tra, the compensation assist torque Trb, and the automatic steering torque Btr. The combination of the basic assist torque Tra and the compensation assist torque Trb is a control amount for assisting the operation by the driver on the steering wheel SW, and thus, corresponds the above-mentioned "first control amount".

In the first period, the motor controller 630 obtains the motor control amount Mtr according to Expression 7 described below.

$$Mtr=(Tra+\alpha\cdot Trb)+Btr \quad (7)$$

According to this configuration, in the first period, the "relationship between the steering angle θ and the steering torque Tr" becomes the line 803 of FIG. 8. The driver can operate the steering wheel SW with a feeling similar to that of the case in which the operation state of the LKA is the off state.

On the other hand, in the second period, the motor controller 630 executes correction processing for changing a proportion P2 of the compensation assist torque Trb in the motor control amount Mtr according to Expression (8) described below. In other words, the above-mentioned proportion P2 is a degree of influence of the compensation assist torque Trb on the motor control amount Mtr. Hereinafter, the proportion P2 will be referred to as "second proportion P2". Further, the correction processing in this example will be referred to as "second correction processing". In Expression (8), it should be noted that 0<α<1.

$$Mtr=(Tra+\alpha \cdot Trb)+Btr \tag{8}$$

It is assumed that the vehicle 100 travels at a speed (for example, Vsb). By the second correction processing, for the steering torque Tr having the same magnitude, the second proportion P2 in the second period becomes smaller than the second proportion P2 in the first period. That is, the degree of influence of the compensation assist torque Trb on the motor control amount Mtr in the second period is smaller than that in the first period. In the second period, the "relationship between the steering angle θ and the steering torque Tr" becomes the line 804 in FIG. 8. Therefore, the specific steering amount (θ2) in the second period becomes smaller than the specific steering amount (θ1) in the first period.

Operation

Figure 16:
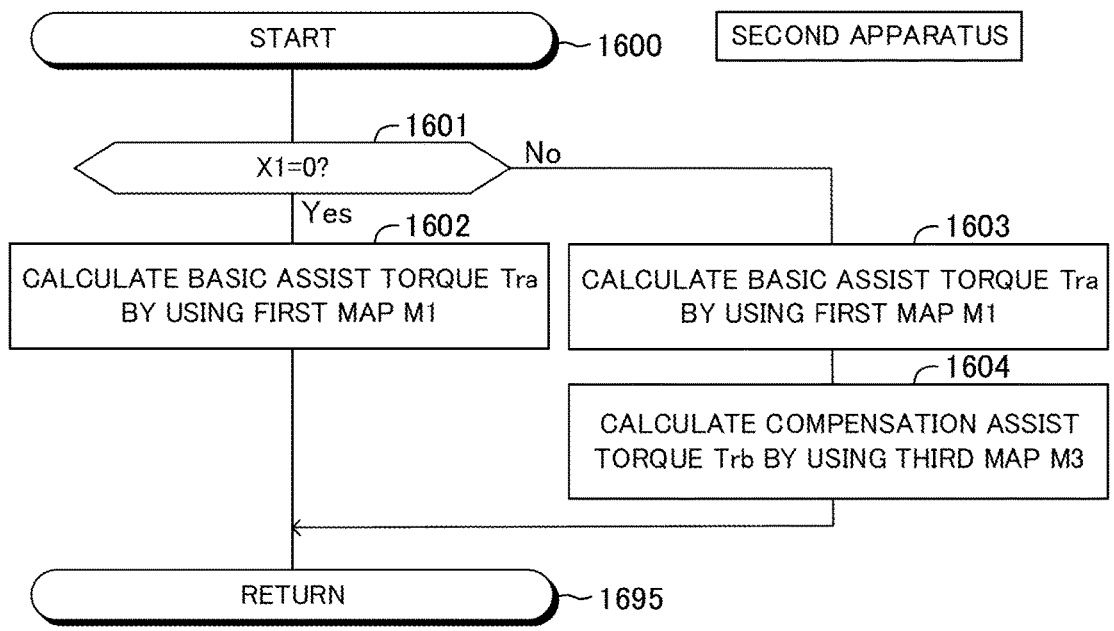
FIG. 16 is a flowchart for illustrating a "first control amount calculation routine" to be executed by the driving support ECU according to the second embodiment.
Figure 17:
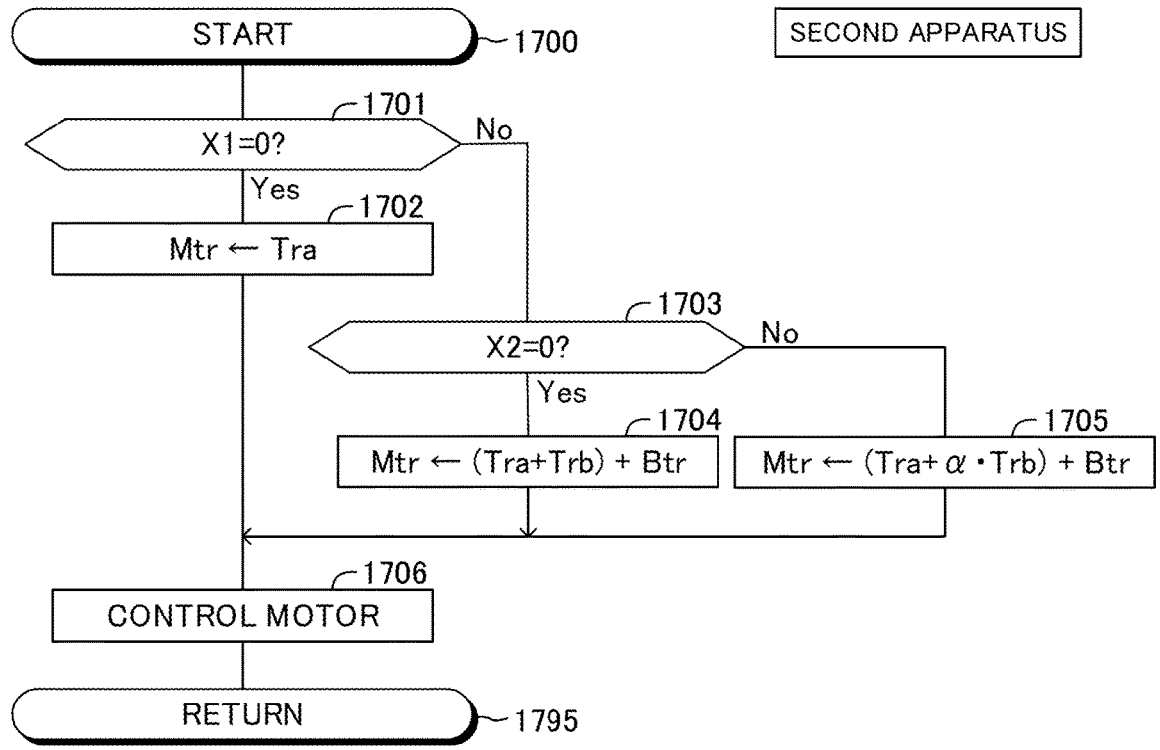
FIG. 17 is a flowchart for illustrating a "motor control routine" to be executed by the driving support ECU according to the second embodiment.

The second apparatus is different from the first apparatus in that the CPU of the ECU 10 is configured to execute a routine of FIG. 16 in place of the routine of FIG. 10, and execute a routine of FIG. 17 in place of the routine of FIG. 12. A description is now mainly given of those differences.

The CPU is configured to execute a "first control amount calculation routine" illustrated in FIG. 16 every time the predetermined time elapses. When a predetermined timing has come, the CPU starts the process from Step 1600 of FIG. 16, and proceeds to Step 1601 to determine whether the value of the execution flag X1 is "0".

When the value of the execution flag X1 is "0", the CPU makes a "Yes" determination in Step 1601, and proceeds to Step 1602. In Step 1602, the CPU applies the steering torque Tr and the vehicle speed SPD to the first map M1 to obtain the basic assist torque Tra. Thereafter, the CPU proceeds to Step 1695 to end the current execution of the present routine.

On the other hand, when the value of the execution flag X1 is "1", the CPU makes a "No" determination in Step 1601, and sequentially executes the processing of Steps 1603 and 1604 which are described below. Thereafter, the CPU proceeds to Step 1695 to end the current execution of the present routine.

Step 1603: The CPU applies the steering torque Tr and the vehicle speed SPD to the first map M1 to obtain the basic assist torque Tra.

Step 1604: The CPU applies the steering torque Tr and the vehicle speed SPD to the third map M3 to obtain the compensation assist torque Trb.

Further, the CPU is configured to execute a "motor control routine" illustrated in FIG. 17 every time the predetermined time elapses. When a predetermined timing has come, the CPU starts the process from Step 1700 of FIG. 17, and proceeds to Step 1701 to determine whether the value of the execution flag X1 is "0".

When the value of the execution flag X1 is "0", the CPU makes a "Yes" determination in Step 1701, and proceeds to Step 1702 to set the basic assist torque Tra as the motor control amount Mtr. Next, in Step 1706, the CPU controls the motor 61 by using the steering ECU 40 such that the actual torque generated by the motor 61 matches (becomes equal to) the motor control amount Mtr. Thereafter, the CPU proceeds to Step 1795 to end the current execution of the present routine.

On the other hand, when the value of the execution flag X1 is not "0", the CPU makes a "No" determination in Step 1701, and proceeds to Step 1703 to determine whether the value of the transition flag X2 is "0". When the value of the transition flag X2 is "0", the CPU makes a "Yes" determination in Step 1703, and proceeds to Step 1704 to calculate the motor control amount Mtr according to Expression (7). Next, in Step 1706, the CPU controls the motor 61 based on the motor control amount Mtr as described above. Thereafter, the CPU proceeds to Step 1795 to end the current execution of the present routine.

When the value of the transition flag X2 is not "0" (that is, the value of the transition flag X2 is "1" or "2") in Step 1703, the CPU makes a "No" determination, and proceeds to Step 1705 to execute the second correction processing. Specifically, the CPU calculates the motor control amount Mtr according to the Expression (8). Next, in Step 1706, the CPU controls the motor 61 based on the motor control amount Mtr as described above. Thereafter, the CPU proceeds to Step 1795 to end the current execution of the present routine.

As described above, the second apparatus executes the second correction processing such that, for the steering torque Tr having the same magnitude, the second proportion P2 in the second period becomes smaller than the second proportion P2 in the first period. The second apparatus changes the second proportion P2 in this manner to thereby make the specific steering amount in the second period smaller than the specific steering amount in the first period.

Modification Example 1 of Second Apparatus

The motor controller 630 may execute the second correction processing according to Expression (9) described below.

$$Mtr=(Tra+\alpha \cdot Trb)+(2-\alpha)\cdot Btr \tag{9}$$

Modification Example 2 of Second Apparatus

Figure 18:
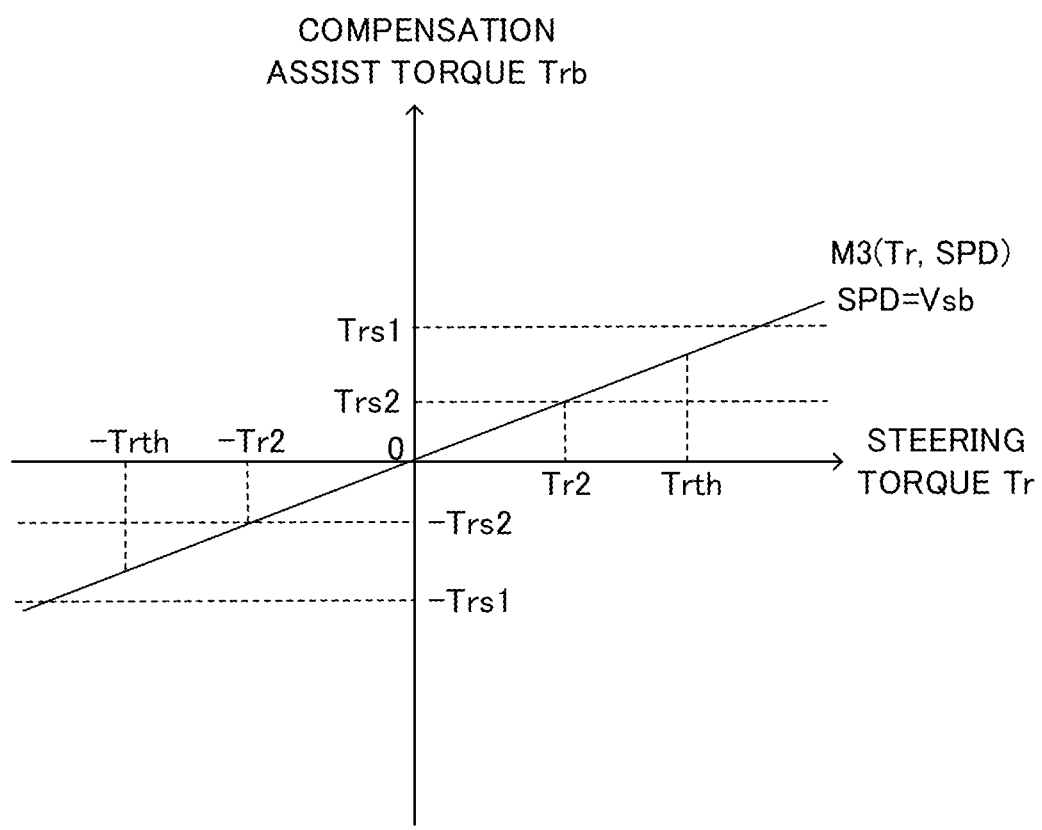
FIG. 18 is a diagram for illustrating a relationship between an upper limit value and the third map M3 according to a modification example of the second embodiment.

An upper limit value (hereinafter, referred to as "third upper limit value") may be set for the magnitude (absolute value) of the compensation assist torque Trb. In this configuration, the second correction processing may be processing for setting the third upper limit value in the second period to be smaller than the third upper limit value in the first period. For example, the case in which the steering torque Tr is a positive value will be described. As illustrated in FIG. 18, in the first period, the compensation assist torque calculation module 613 sets "Trs1" as the third upper limit value. In the first period, the compensation assist torque calculation module 613 limits the magnitude of the compensation assist torque Trb by Trs1 to thereby obtain the compensation assist torque Trb. Further, in the second period, the compensation assist torque calculation module 613 sets "Trs2" as the third upper limit value. In the second period, the compensation assist torque calculation module 613 limits the magnitude of the compensation assist torque Trb by Trs2 to thereby obtain the compensation assist torque Trb. Trs2 is smaller than Trs1. Further, in the third map M3, the steering torque Tr2 at which the compensation assist torque Trs2 is obtained is smaller than the torque threshold Trth. According to this configuration, when the driver inputs the steering torque Tr having a magnitude equal to or larger than the torque threshold Trth to the steering wheel SW in the second period, the compensation assist torque Trb is limited by the third upper limit value Trs2. As a result, the specific steering amount in the second period becomes smaller than the specific steering amount in the first period.

Third Embodiment

Next, a vehicle control apparatus (hereinafter referred to as "third apparatus") according to a third embodiment will be described. The third apparatus is different from the second apparatus in that it changes the second proportion P2 according to the type of the driving operation switching request.

In the case in which the driving operation switching request is the second request, this means that the abnormality has occurred in at least one of the components of the vehicle control apparatus. In consideration of safety, the third apparatus may further suppress the lateral movement amount of the vehicle. Therefore, in the second period, the motor controller 630 obtains the motor control amount Mtr according to the type of the driving operation switching request as follows.

In the case in which the driving operation switching request is the first request, the motor controller 630 executes the second correction processing according to Expression (10) described below. Here, $\alpha 1 < 1$.

$$Mtr = (Tra + \alpha 1 \cdot Trb) + Btr \tag{10}$$

In the case in which the driving operation switching request is the second request, the motor controller 630 executes the second correction processing according to Expression (11) described below. Here, $\alpha 2 < \alpha 1 < 1$.

$$Mtr = (Tra + \alpha 2 \cdot Trb) + Btr \tag{11}$$

Figure 19:
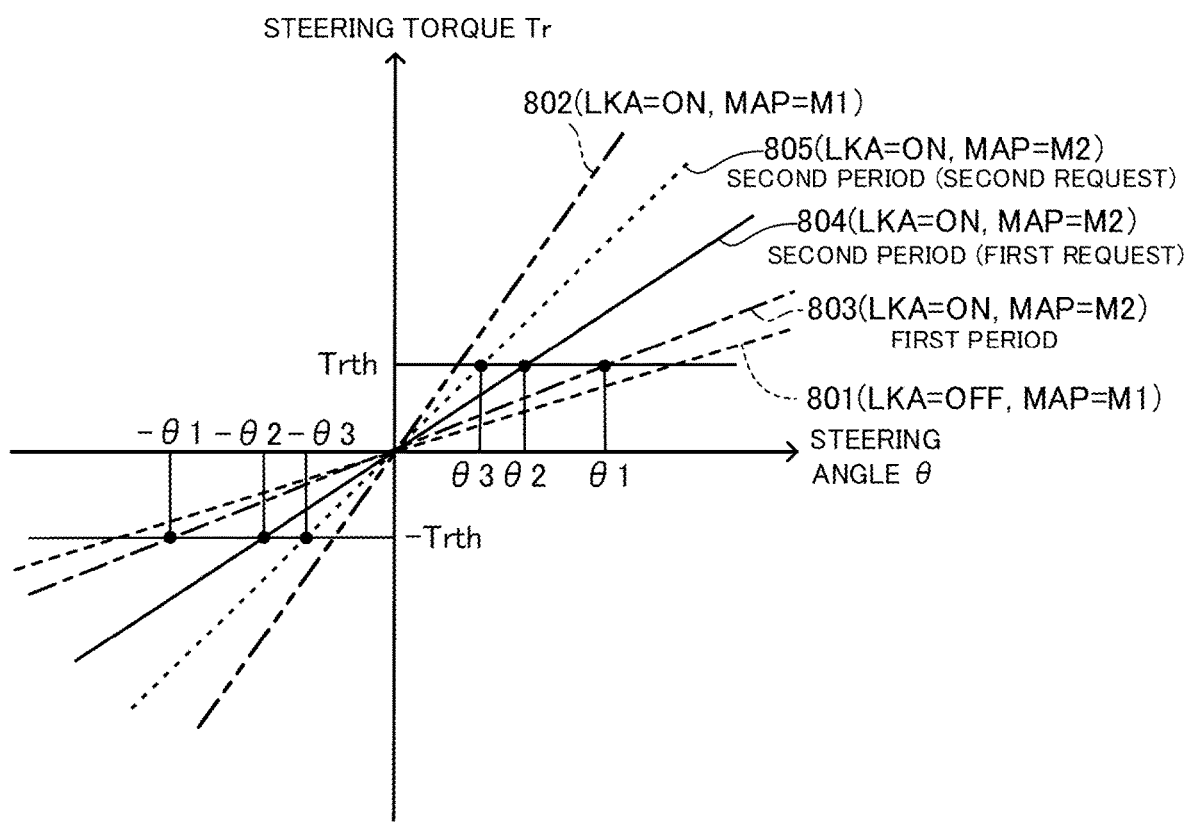
FIG. 19 is a diagram for illustrating a relationship between the steering angle θ of the steering wheel SW and the steering torque Tr according to a third embodiment.

A solid line 804 of FIG. 19 is the same as the solid line 804 of FIG. 8, and represents the relationship between θ and Tr in the case in which the driving operation switching request is the first request. A dotted line 805 of FIG. 19 represents the relationship between θ and Tr in the case in which the driving operation switching request is the second request. The line 805 is closer to the line 802 than the line 804. Under the condition that the driver inputs the steering torque Tr having the same magnitude in the second period, the magnitude |θ| of the steering angle θ in the case in which the second request is issued is smaller than the magnitude |θ| of the steering angle θ in the case in which the first request is issued. As a result, the specific steering amount (θ3) in the case in which the second request is issued becomes smaller than the specific steering amount (θ2) in the case in which the first request is issued. Hereinafter, "θ3" will be referred to as "third angle".

According to this configuration, the third apparatus executes the second correction processing such that the second proportion P2 in the case in which the second request is issued becomes smaller than the second proportion P2 in the case in which the first request issued. In the case in which the first request is issued, the third apparatus calculates the motor control amount Mtr such that the magnitude |Tr| of the steering torque reaches the torque threshold Trth when the driver changes the magnitude of the steering angle θ of the steering wheel SW by the second angle (θ2) in the second period. Meanwhile, in the case in which the second request is issued, the third apparatus calculates the motor control amount Mtr such that the magnitude |Tr| of the steering torque reaches the torque threshold Trth when the driver changes the magnitude of the steering angle θ of the steering wheel SW by the third angle (θ3) in the second period. The third angle (θ3) is smaller than the second angle (θ2).

Therefore, in the case in which the second request is issued, the driver operates the steering wheel SW with a smaller steering angle θ to thereby indicate to the vehicle control apparatus that he/she has become the manual operation possible state. Further, the lateral movement amount of the vehicle is suppressed in the situation in which the abnormality has occurred in the vehicle control apparatus. Therefore, safety can be increased. Furthermore, for the steering angle θ having the same magnitude, the load (steering torque Tr) felt by the driver on the steering wheel SW in the case in which the second request is issued becomes larger than that of the case in which the first request is issued. This enables the driver to recognize that the abnormality has occurred.

Modification Example 1 of Third Apparatus

In the case in which the driving operation switching request is the second request, the third apparatus may change the second proportion P2 according to the type of the component. For example, when the abnormality has occurred in the notification device, the motor controller 630 executes the second correction processing according to Expression (11). On the other hand, when the abnormality has occurred in the component other than the notification device, it is considered that the influence on the traveling of the vehicle is large. In this case, the motor controller 630 executes the second correction processing according to Expression (12) described below. Here, $\alpha 3 < \alpha 2 < \alpha 1 < 1$.

$$Mtr = (Tra + \alpha 3 \cdot Trb) + Btr \tag{12}$$

According to this configuration, in the case in which the abnormality has occurred in the component having a large influence on the traveling of the vehicle, the driver operates the steering wheel SW with a smaller steering angle θ to thereby indicate to the vehicle control apparatus that he/she has become the manual operation possible state. It is possible to suppress the lateral movement amount of the vehicle in the situation in which the abnormality has occurred in the component having a large influence on the traveling of the vehicle. Therefore, safety can be improved.

Modification Example 2 of Third Apparatus

The above configuration may be applied to the first apparatus. The motor controller 630 may change the first proportion P1 according to the type of the driving operation switching request. In the case in which the driving operation switching request is the first request, the motor controller 630 executes the first correction processing according to Expression (13) described below.

$$Mtr = \alpha 1 \cdot Atr + Btr \tag{13}$$

In the case in which the driving operation switching request is the second request, the motor controller 630 executes the first correction processing according to Expression (14) described below. Here, $\alpha 2 < \alpha 1 < 1$.

$$Mtr = \alpha 2 \cdot Atr + Btr \tag{14}$$

Modification Example 3 of Third Apparatus

The motor controller 630 may execute processing for gradually reducing the second proportion P2 with the lapse of time from the time when the driving operation switching request is issued. The motor controller 630 may gradually reduce the second proportion P2 such that the amount of reduction of the second proportion P2 per unit time in the case in which the second request is issued is larger than the amount of reduction of the second proportion P2 per unit time in the case in which the first request is issued. Also in this configuration, the second proportion P2 in the case in which the second request is issued becomes smaller than the second proportion P2 in the case in which the first request is issued. In the case in which the second request is issued, the driver operates the steering wheel SW with a smaller steering angle θ to thereby indicate to the vehicle control apparatus that he/she has become the manual operation possible state. In the same way, the motor controller 630 may change the amount of reduction of the first proportion P1 per unit time according to the type of the driving operation switching request.

Fourth Embodiment

Next, a vehicle control apparatus (hereinafter referred to as "fourth apparatus") according to a fourth embodiment will be described. The fourth apparatus is different from the second apparatus in that the map for obtaining the compensation assist torque Trb differs between the first period and the second period.

In the case in which the relationship between θ and Tr becomes the solid line 804 of FIG. 8 in the second period, a large steering torque Tr is required for the driver to steer/rotate the steering wheel SW largely. That is, the load felt by the driver when operating the steering wheel SW is large. For example, it is assumed that, in the second period, the driver attempts to steer the steering wheel SW largely to avoid an obstacle on the road. Although the driver attempts to steer the steering wheel SW largely to move the vehicle laterally, the load is large. Therefore, it may take time to reflect the intention of the driver.

Figure 20:
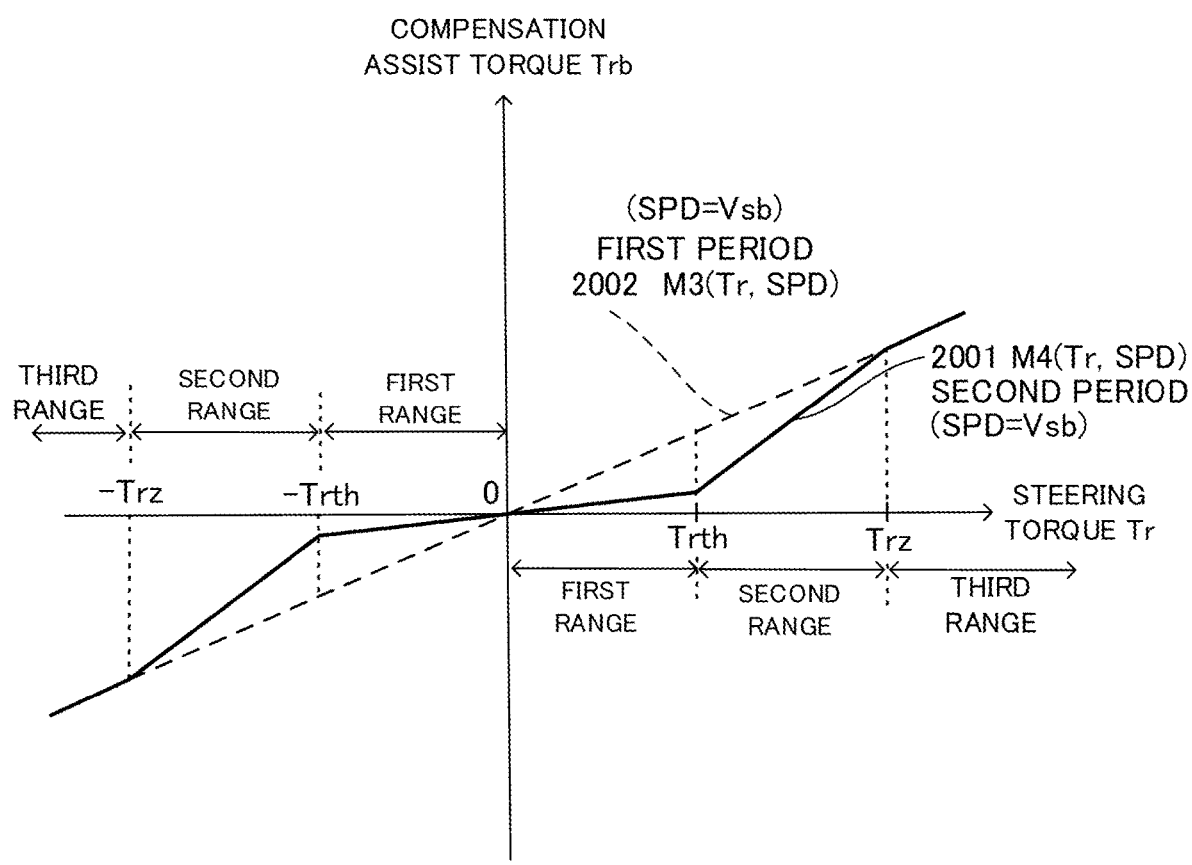
FIG. 20 is a diagram for illustrating a fourth map M4 representing a relationship between the steering torque Tr, the vehicle speed SPD, and the compensation assist torque Trb according to a fourth embodiment.

In view of the above, the compensation assist torque calculation module 613 applies the steering torque Tr and the vehicle speed SPD to a fourth map M4 (Tr, SPD) illustrated in FIG. 20 to obtain the compensation assist torque Trb. Therefore, the fourth apparatus corrects/modifies the magnitude of the compensation assist torque Trb in response to the steering torque Tr to thereby execute the second correction processing. In the second period, the motor controller 630 obtains the motor control amount Mtr according to Expression (15) described below.

$$Mtr=(Tra+Trb)+Btr \quad (15)$$

In FIG. 20, in order to simplify the description, only the relationship between Tr and Trb in the case of SPD=Vsb among the plurality of vehicle speeds SPD is shown. A solid line 2001 represents the fourth map M4 used in the second period, and a dotted line 2002 represents the third map M3 used in the first period.

In the fourth map M4, a first range, a second range, and a third range are set. The first range is a range in which the magnitude (absolute value) of the steering torque Tr is "0" or more and less than or equal to "Trth". The second range is a range in which the magnitude of the steering torque Tr is larger than "Trth" and less than or equal to "Trz". Here, "Trz" is the steering torque Tr at which the compensation assist torque Trb matches the value obtained by the third map M3. The third range is a range in which the magnitude of the steering torque Tr is larger than "Trz".

In the first range, the compensation assist torque Trb is equal to the value obtained by the third map M3 multiplied by "α". That is, in the first range, the motor control amount Mtr is equal to the value obtained according to Expression (8) in the second apparatus. Therefore, with respect to the steering torque Tr having the same magnitude, the second proportion P2 in the second period is smaller than the second proportion P2 in the first period. As a result, the specific steering amount in the second period becomes smaller than the specific steering amount in the first period.

In the second range, the amount of increase in the compensation assist torque Trb per unit steering torque Tr is larger than that in the first range. In the second range, the compensation assist torque Trb gradually approaches the value obtained by the third map M3. That is, as the magnitude of the steering torque Tr increases, the second proportion P2 in the second period approaches the second proportion P2 in the first period. As described above, when the motor controller 630 executes the second correction processing in the second range, the motor controller 630 corrects the compensation assist torque Trb such that, as the magnitude of the steering torque Tr increases, the second proportion P2 in the second period approaches the second proportion P2 in the first period.

In the third range, the compensation assist torque Trb corresponds to the value obtained by the third map M3.

Figure 21:
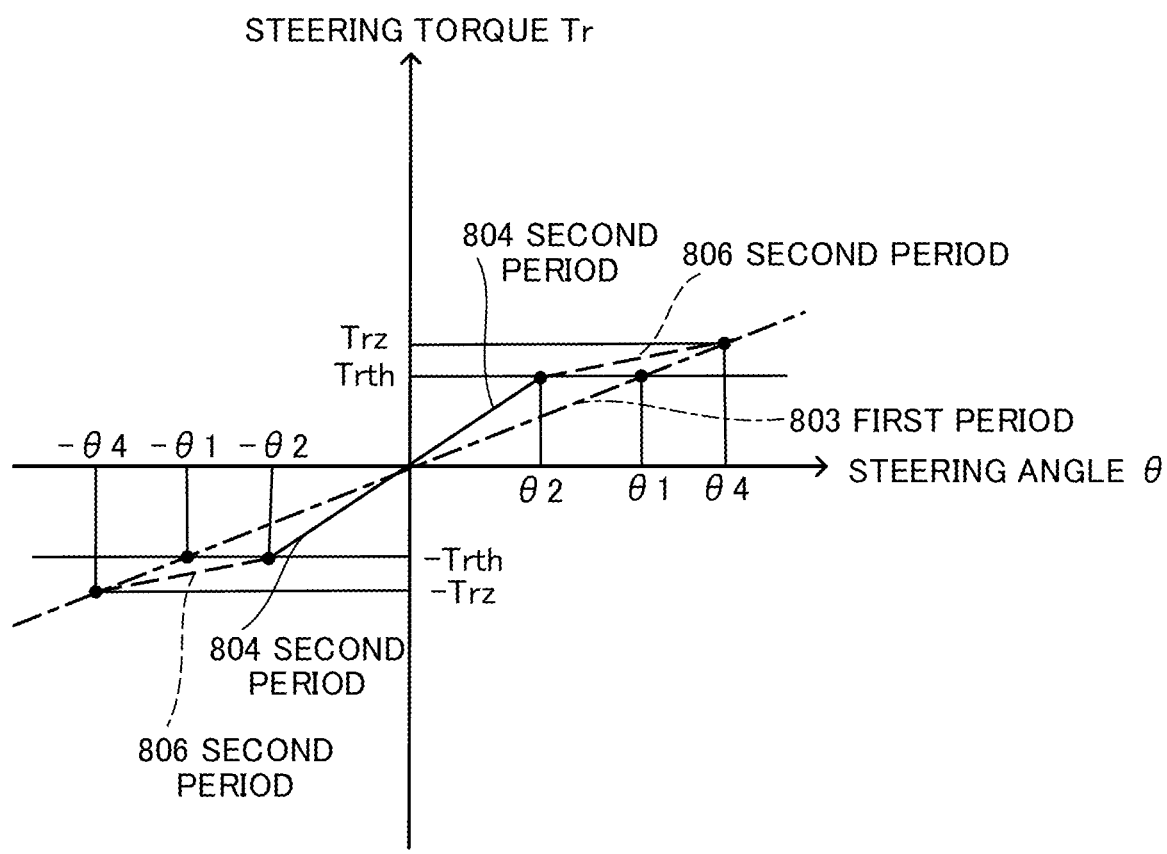
FIG. 21 is a diagram for illustrating a relationship between the steering angle θ of the steering wheel SW and the steering torque Tr according to the fourth embodiment.

According to this configuration, as illustrated in FIG. 21, in the case in which the steering angle θ is in the following range: 0≤|θ|≤θ2 in the second period, the relationship between θ and Tr is a solid line 804. The solid line 804 in FIG. 21 is the same as the solid line 804 in FIG. 8. Therefore, the specific steering amount (θ2) in the second period is smaller than the specific steering amount (θ1) in the first period.

In the case in which the steering angle θ is in the following range: θ2 <|θ|≤θ4 in the second period, the relationship between θ and Tr is a dotted line 806. The steering angle θ4 is a steering angle at which the steering torque Tr coincides with the alternate long and short dash line 803. That is, the steering angle θ4 is a steering angle at which the steering torque Tr becomes Trz.

In the case in which the steering angle θ is in the following range: |θ|>θ4 in the second period, the relationship between θ and Tr is the alternate long and short dash line 803. Therefore, in this range, the relationship between θ and Tr is the same as the relationship in the first period.

As illustrated in FIG. 21, the "amount of increase in the steering torque Tr per unit steering angle θ" in the range of |θ|>θ2 is smaller than the "amount of increase in the steering torque Tr per unit steering angle θ" in the range of 0≤|θ|≤θ2. That is, when the driver steers the steering wheel SW with a large torque exceeding the torque threshold Trth, the load felt by the driver on the steering wheel SW is suppressed. Therefore, when the driver intentionally steers the steering wheel SW largely, the fourth apparatus can suppress the load (steering torque Tr) on the steering wheel SW to thereby easily reflect the intention of the driver.

Also in the second period, in the range of |θ|>θ4, the relationship between θ and Tr becomes the line 803. Therefore, when the driver steers the steering wheel SW such that the amount of change in the steering angle θ exceeds θ4, the driver can operate the steering wheel SW with the same feeling as in the first period.

Modification Example 1 of Fourth Apparatus

In the fourth map M4, the compensation assist torque Trb in the second range may be defined by Expressions (16) and (17) described below.

$$Trb=(\alpha+(1-\alpha)\cdot\zeta)\cdot M3(Tr,SPD) \quad (16)$$

$$\zeta=(Tr-Trth)/(Trz-Trth) \quad (17)$$

Modification Example 2 of Fourth Apparatus

Figure 22:
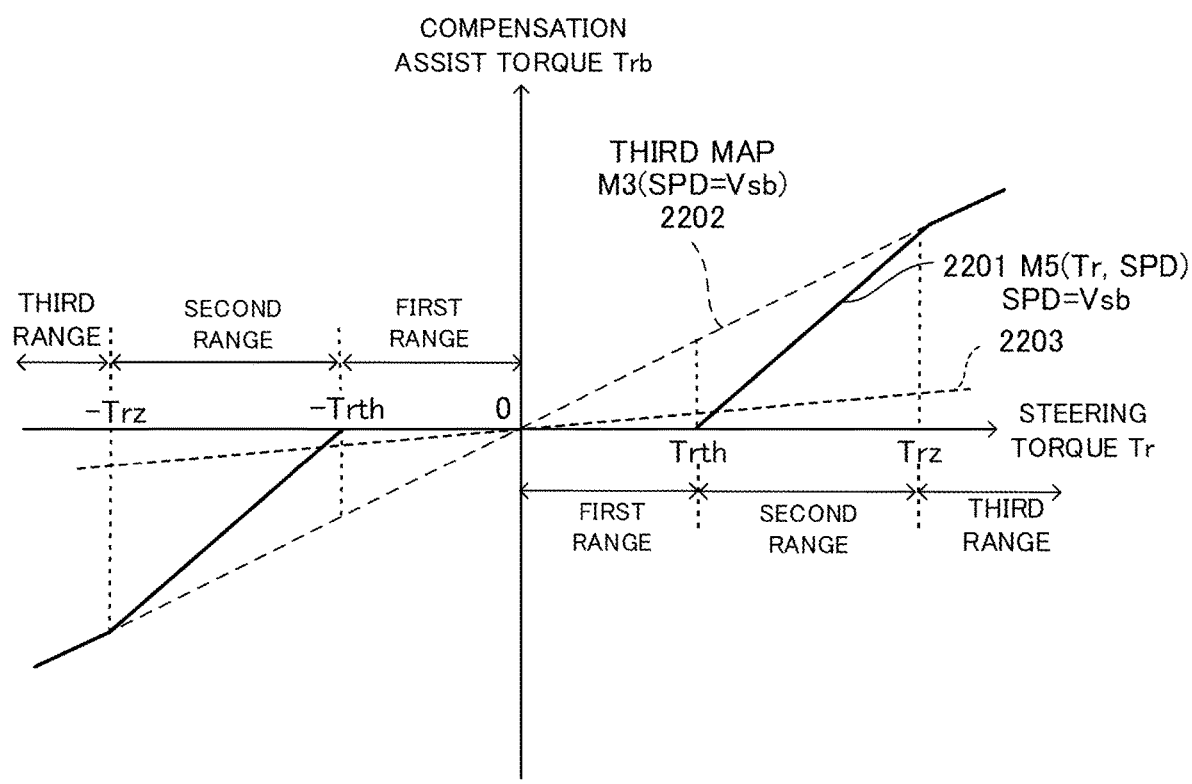
FIG. 22 is a diagram for illustrating a fifth map M5 representing a relationship between the steering torque Tr, the vehicle speed SPD, and the compensation assist torque Trb according to a modification example of the fourth embodiment.

In the second period, the compensation assist torque calculation module 613 apples the steering torque Tr and the vehicle speed SPD to a fifth map M5 (Tr,SPD) illustrated in FIG. 22 to obtain the compensation assist torque Trb. In FIG. 22, in order to simplify the description, only the relationship between Tr and Trb in the case of SPD=Vsb among the plurality of vehicle speeds SPD is shown. A solid line 2201 represents the relationship in the fifth map M5, and a dotted line 2202 represents the relationship in the third map M3. Further, a dotted line 2203 represents the value obtained by the third map M3 multiplied by "α".

In the fifth map M5, when the steering torque Tr is in the first range, the compensation assist torque Trb is zero. In the second range, as the magnitude of the steering torque Tr increases, the compensation assist torque Trb gradually approaches the value obtained by the third map M3. In the third range, the compensation assist torque Trb corresponds to the value obtained by the third map M3.

In the case in which the steering angle θ is in the following range: θ2<|θ|≤θ4 in the second period, the relationship between θ and Tr substantially coincides with the dotted line 806 shown in FIG. 21. Therefore, when the driver attempts to steer the steering wheel SW greatly to move the vehicle laterally, the load felt by the driver can be suppressed.

Modification Example 3 of Fourth Apparatus

The above configuration may be applied to the first apparatus. That is, the motor controller 630 may correct the assist torque Atr and/or the automatic steering torque Btr according to the steering torque Tr such that the relationship of the dotted line 806 shown in FIG. 21 is satisfied in the case in which the steering angle θ is in the following range: θ2<|θ|≤θ4.

Fifth Embodiment

Next, a vehicle control apparatus (hereinafter referred to as "fifth apparatus") according to a fifth embodiment will be described. The fifth apparatus is different from the second apparatus in that the correction processing is changed according to whether the driver holds the steering wheel SW.

It is assumed that the driver is operating the steering wheel SW at the time point at which the driving operation switching request is issued. In this case, when the second correction processing is executed according to Expression (8) from the time point at which the driving operation switching request is issued, the load on the steering wheel SW suddenly is changed. This causes the driver to feel a sense of discomfort.

In view of the above, the motor controller 630 determines whether the driver holds the steering wheel SW based on the signal from the touch sensor 17 at the time point at which the driving operation switching request is issued.

In the case in which the driver does not hold the steering wheel SW, the driver does not feel a sense of discomfort even if the load on the steering wheel SW is changed suddenly. Therefore, in the case in which the motor controller 630 determines that the driver does not hold/grip the steering wheel SW at the time point at which the driving operation switching request is issued, the motor controller 630 executes the second correction processing according to Expression (8).

Figure 23:
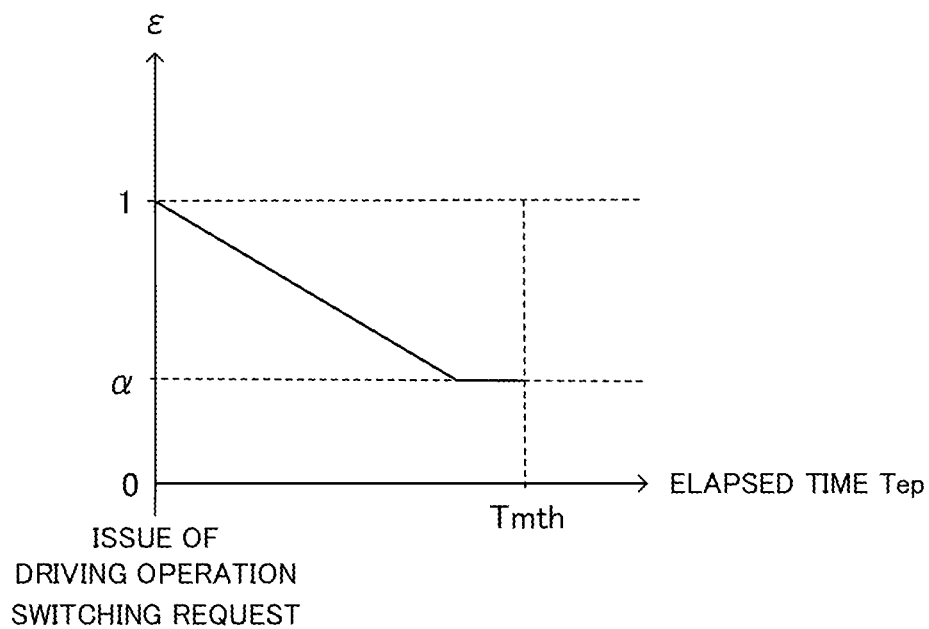
FIG. 23 is a diagram for illustrating a relationship between an elapsed time Tep since a driving operation switching request is issued and a coefficient ε according to a fifth embodiment.

On the other hand, in the case in which the motor controller 630 determines that the driver holds/grips the steering wheel SW at the time point at which the driving operation switching request is issued, the motor controller 630 executes correction processing for gradually reducing the second proportion P2 with the lapse of time from the time point at which the driving operation switching request is issued. Specifically, in the second period, the motor controller 630 calculates the motor control amount Mtr according to Expression (18) described below. The motor controller 630 gradually reduces ε in Expression (18) from "1" to α, as illustrated in FIG. 23. The correction processing in this example will be referred to as "third correction processing". The motor controller 630 maintains ε at α after ε reaches α.

$$Mtr=(Tra+\varepsilon\cdot Trb)+Btr \quad (18)$$

According to this configuration, in the case in which the driver holds the steering wheel SW, the load on the steering wheel SW is gradually changed without being suddenly changed. Therefore, the possibility that the driver feels a sense of discomfort can be reduced. Further, "ε" of Expression (18) decreases with the lapse of time from the time point at which the driving operation switching request is issued. For the steering torque Tr having the same magnitude, the second proportion P2 in the second period becomes smaller than the second proportion P2 in the first period. Therefore, the specific steering amount in the second period becomes smaller than the specific steering amount in the first period. In the second period, even when the driver operates the steering wheel SW to indicate to the vehicle control apparatus that he/she is in the manual operation possible state, the lateral movement amount of the vehicle is suppressed.

Modification Example 1 of Fifth Apparatus

The motor controller 630 may gradually reduce "ε" of Expression (18) from "1" to a according to Expression (19) described below from the time point at which the driving operation switching request is issued. According to this configuration, ε becomes a when the elapsed time Tep reaches the time threshold Tmth. As described above, the range that can be taken by Tep is as follows: 0≤Tep≤Tmth.

$$\varepsilon=(Tmth-(1-\alpha)\cdot Tep)/Tmth \quad (19)$$

Modification Example 2 of Fifth Apparatus

The motor controller 630 may execute the third correction processing such that the amount of reduction in the second proportion P2 per unit time in the case in which the second request is issued becomes larger than the amount of reduction in the second proportion P2 per unit time in the case in which the first request is issued.

Figure 24:
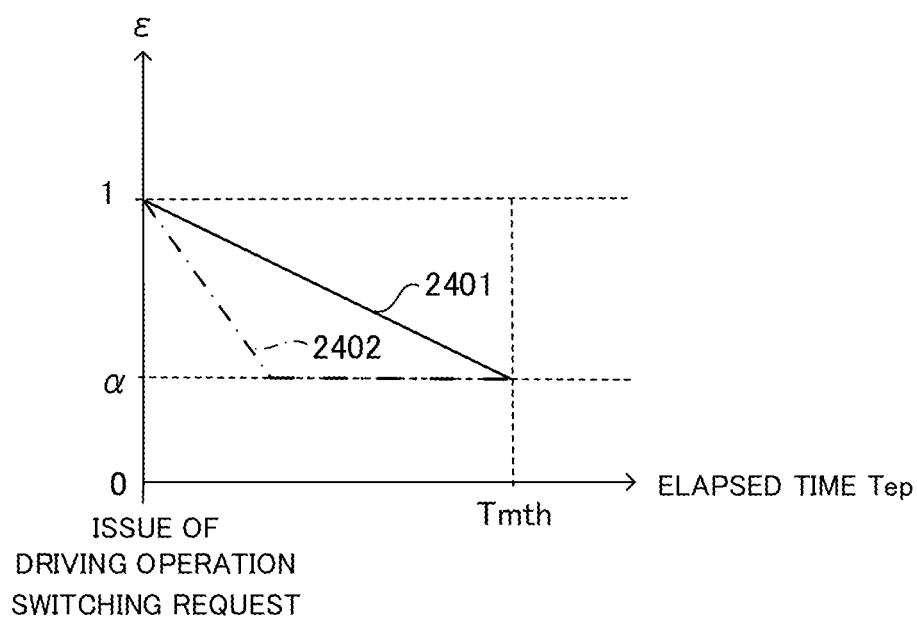
FIG. 24 is a diagram for illustrating a relationship between the elapsed time Tep since the driving operation switching request is issued and the coefficient ε according to a modification example of the fifth embodiment.

Specifically, in the case in which the first request is issued, the motor controller 630 gradually reduces "ε" of Expression (18) according to a solid line 2401 shown in FIG. 24.

Meanwhile, in the case in which the second request is issued, the motor controller 630 gradually reduces "ε" of Expression (18) according to an alternate long and short dash line 2402 shown in FIG. 24. After ε reaches α, the motor controller 630 maintains ε at α.

According to this configuration, the amount of reduction in the second proportion P2 per unit time in the case in which the second request is issued becomes larger. The specific steering amount in the case in which the second request is issued becomes smaller than the specific steering amount in the case in which the first request is issued. Therefore, in the case in which the second request is issued, the driver operates the steering wheel SW with a smaller steering angle θ to thereby indicate to the vehicle control apparatus that he/she has become the manual operation possible state. Further, the lateral movement amount of the vehicle is suppressed in the situation in which the abnormality has occurred in the vehicle control apparatus. Therefore, safety can be increased. Furthermore, for the steering angle having the same magnitude, the load (steering torque Tr) on the steering wheel SW in the case in which the second request is issued becomes larger than the load on the steering wheel SW in the case in which the first request is issued. This enables the driver to recognize that the abnormality has occurred.

Modification Example 3 of Fifth Apparatus

The motor controller 630 may determine that the driver holds the steering wheel SW when the magnitude of the steering torque Tr is equal to or larger than a predetermined torque value Trah at the time point at which the driving operation switching request is issued. Further, the motor controller 630 may execute the third correction processing such that, the larger the magnitude of the steering torque Tr, the smaller the amount of reduction in the second proportion P2 per unit time. According to this configuration, when the driver inputs a large torque to the steering wheel SW, the amount of change in the load on the operation of the steering wheel SW becomes small. Therefore, the possibility that the driver feels a sense of discomfort can be reduced.

Modification Example 4 of Fifth Apparatus

The motor controller 630 may determine whether the driver holds the steering wheel SW based on image data from a camera (driver monitor) installed in a vehicle interior.

Modification Example 5 of Fifth Apparatus

The motor controller 630 may execute only the third correction processing in the second period. In this configuration, the motor controller 630 may execute the third correction processing such that the amount of reduction in the second proportion P2 per unit time in the case in which the driver holds the steering wheel SW becomes smaller than the amount of reduction in the second proportion P2 per unit time in the case in which the driver does not hold the steering wheel SW.

Specifically, in the case in which the motor controller 630 determines that the driver holds the steering wheel SW, the motor controller 630 gradually reduces "ε" of Expression (18) according to the solid line 2401 in FIG. 24. On the other hand, in the case in which the motor controller 630 determines that the driver does not hold the steering wheel SW, the motor controller 630 gradually reduces "ε" of Expression (18) according to the alternate long and short dash line 2402 in FIG. 24. According to this configuration, the amount of change in the load with respect to the operation of the steering wheel SW in the case in which the driver holds the steering wheel SW is small compared with the amount of change in the load in the case in which the driver does not hold the steering wheel SW. Therefore, the possibility that the driver feels a sense of discomfort can be reduced.

Modification Example 6 of Fifth Apparatus

Each of the above-mentioned configurations of the fifth apparatus may be applied to the first apparatus. For example, in the case in which the motor controller 630 determines that the driver holds the steering wheel SW, the motor controller 630 may execute the third correction processing such that the first proportion P1 gradually decreases with the lapse of time. For example, in the case in which the motor controller 630 determines that the driver holds the steering wheel SW, the motor controller 630 may gradually reduce "ρ" of Expression 20 or 21 described below from "1" to "α".

$$Mtr = \rho \cdot Atr + (2-\rho) \cdot Btr \qquad (20)$$

$$Mtr = \rho \cdot Atr + Btr \qquad (21)$$

In another example, in the case in which the motor controller 630 determines that the driver holds the steering wheel SW, the motor controller 630 may gradually increase "α" of Expression 22 described below from "1" to "β".

$$Mtr = Atr + \sigma \cdot Btr \qquad (22)$$

The present disclosure is not limited to the above-described embodiments and modification examples. Various modifications and alterations can be adopted within the scope of the present disclosure.

Although each of the first to fifth apparatuses performs the LKA only during the execution of ACC, but the configuration is not limited to this. Each of the first to fifth apparatuses may perform the LKA even in a situation in which the ACC is not being performed. Further, each of the above-mentioned configurations can be applied not only to the vehicle control apparatus configured to perform the LKA but also to a vehicle control apparatus configured to perform, as the driving support control, automatic driving control for automatically changing the steering angle such that the vehicle travels along a predetermined target travel line.

What is claimed is:
1. A control apparatus for a vehicle, comprising:
a steering mechanism that mechanically connects a steering wheel of the vehicle and a steered wheel via a steering shaft;
a motor provided in the steering mechanism and configured to generate a torque for changing an angle of the steered wheel;
a steering torque sensor configured to detect a steering torque acting on the steering shaft by an operation by a driver on the steering wheel; and
a controller configured to:
calculate a first control amount for assisting the operation by the driver on the steering wheel based on the steering torque, and perform steering assist control for driving the motor based on the first control amount,
in a case in which a driving support operation state is an on state, calculate a second control amount for changing the angle of the steered wheel such that the vehicle travels along a predetermined target travel line, and perform driving support control for driving the motor based on the second control amount,
wherein:
the controller is configured to:
  in a case in which the driving support operation state is an off state, calculate a motor control amount based on the first control amount, and perform the steering assist control by generating the torque corresponding to the motor control amount in the motor, and
  in the case in which the driving support operation state is the on state, calculate the motor control amount based on the first control amount and the second control amount, and perform the steering assist control and the driving support control by generating the torque corresponding to the motor control amount in the motor,
the controller is configured to, in a case in which a driving operation switching request, which is a request for changing the driving support operation state from the on state to the off state, is issued,
  determine whether a magnitude of the steering torque reaches a predetermined torque threshold, and
  when determining that the magnitude of the steering torque reaches the torque threshold, determine that the driver is in a manual operation possible state in which the driver is ready to operate the steering wheel,
the controller is configured to:
  calculate the motor control amount in a first period such that the magnitude of the steering torque reaches the torque threshold when the driver changes a magnitude of a steering angle of the steering wheel by a first angle, the first period being a period from a time point at which the driving support operation state is changed from the off state to the on state to a time point at which the driving operation switching request is issued, and
  calculate the motor control amount in a second period such that the magnitude of the steering torque reaches the torque threshold when the driver changes the magnitude of the steering angle of the steering wheel by a second angle smaller than the first angle, the second period being a period from the time point at which the driving operation switching request is issued to a time point at which the driving support operation state is changed from the on state to the off state.

2. The control apparatus according to claim 1, wherein the controller is configured to execute, in the second period, first correction processing for changing a first proportion that is a proportion of the first control amount in the motor control amount, and
  the controller is configured to execute the first correction processing such that, for the steering torque having a same magnitude, the first proportion in the second period becomes smaller than the first proportion in the first period.

3. The control apparatus according to claim 2, wherein the driving operation switching request comprises a first request issued in response to an operation by the driver on an operation device, and a second request issued when a predetermined abnormality is detected,
  the controller is configured to execute the first correction processing such that the first proportion in a case in which the second request is issued becomes smaller than the first proportion in a case in which the first request is issued, and
  the controller is configured to:
    in the case in which the first request is issued, calculate the motor control amount such that the magnitude of the steering torque reaches the torque threshold when the driver changes the magnitude of the steering angle of the steering wheel by the second angle in the second period, and
    in the case in which the second request is issued, calculate the motor control amount such that the magnitude of the steering torque reaches the torque threshold when the driver changes the magnitude of the steering angle of the steering wheel by a third angle smaller than the second angle in the second period.

4. The control apparatus according to claim 2, wherein the first control amount comprises a basic assist amount for assisting the operation by the driver on the steering wheel, and a compensation assist amount for compensating at least a part of the basic assist amount canceled by the second control amount,
  the controller is configured to execute, as the first correction processing, second correction processing for changing a second proportion that is a proportion of the compensation assist amount in the motor control amount in the second period, and
  the controller is configured to execute the second correction processing such that, for the steering torque having a same magnitude, the second proportion in the second period becomes smaller than the second proportion in the first period.

5. The control apparatus according to claim 2, wherein, in a case in which the magnitude of the steering torque is larger than the torque threshold, the controller is configured to execute the first correction processing such that, as the magnitude of the steering torque increases, the first proportion in the second period approaches the first proportion in the first period.

6. The control apparatus according to claim 2, further comprising a detector configured to detect whether the driver holds the steering wheel,
  wherein the controller is configured to, in a case in which the detector determines that the driver holds the steering wheel at the time point at which the driving operation switching request is issued, execute, as the first correction processing, third correction processing for gradually reducing the first proportion in the second period with a lapse of time from the time point at which the driving operation switching request is issued.

7. The control apparatus according to claim 6, wherein the driving operation switching request comprises a first request issued in response to an operation by the driver on an operation device, and a second request issued when a predetermined abnormality is detected, and
  the controller is configured to execute the third correction processing such that an amount of reduction in the first proportion per unit time in a case in which the second request is issued becomes larger than the amount of reduction in the first proportion per unit time in a case in which the first request is issued.

8. The control apparatus according to claim 7, wherein the controller is configured to execute the third correction processing such that, the larger the magnitude of the steering torque, the smaller the amount of reduction in the first proportion per unit time.

9. The control apparatus according to claim 1, further comprising a detector configured to detect whether the driver holds the steering wheel, wherein the controller is configured to execute, in the second period, third correction processing for gradually reducing a first proportion with a lapse of time from the time point at which the driving operation switching request is issued, the first proportion being a proportion of the first control amount in the motor control amount, the controller is configured to execute the third correction processing such that, for the steering torque having a same magnitude, the first proportion in the second period becomes smaller than the first proportion in the first period, and the controller is configured to execute the third correction processing such that an amount of reduction in the first proportion per unit time in a case in which the detector determines that the driver holds the steering wheel becomes smaller than the amount of reduction in the first proportion per unit time in a case in which the detector determines that the driver does not hold the steering wheel.

10. A control method for a vehicle including a steering mechanism that mechanically connects a steering wheel of the vehicle and a steered wheel via a steering shaft, a motor provided in the steering mechanism and configured to generate a torque for changing an angle of the steered wheel, and a steering torque sensor configured to detect a steering torque acting on the steering shaft by an operation by a driver on the steering wheel, the control method comprising:

calculating a first control amount for assisting the operation by the driver on the steering wheel based on the steering torque, and performing steering assist control for driving the motor based on the first control amount; and in a case in which a driving support operation state is an on state, calculating a second control amount for changing the angle of the steered wheel such that the vehicle travels along a predetermined target travel line, and performing driving support control for driving the motor based on the second control amount, wherein:

the control method further comprises:

first controlling including, in a case in which the driving support operation state is an off state, calculating a motor control amount based on the first control amount, and performing the steering assist control by generating the torque corresponding to the motor control amount in the motor; and second controlling including, in the case in which the driving support operation state is the on state, calculating the motor control amount based on the first control amount and the second control amount, and performing the steering assist control and the driving support control by generating the torque corresponding to the motor control amount in the motor, the control method further comprises:

in a case in which a driving operation switching request, which is a request for changing the driving support operation state from the on state to the off state, is issued, determining whether a magnitude of the steering torque reaches a predetermined torque threshold, and when determining that the magnitude of the steering torque reaches the torque threshold, determining that the driver is in a manual operation possible state in which the driver is ready to operate the steering wheel, the second controlling further comprises:

first calculating including calculating the motor control amount in a first period such that the magnitude of the steering torque reaches the torque threshold when the driver changes a magnitude of a steering angle of the steering wheel by a first angle, the first period being a period from a time point at which the driving support operation state is changed from the off state to the on state to a time point at which the driving operation switching request is issued, and second calculating including calculating the motor control amount in a second period such that the magnitude of the steering torque reaches the torque threshold when the driver changes the magnitude of the steering angle of the steering wheel by a second angle smaller than the first angle, the second period being a period from the time point at which the driving operation switching request is issued to a time point at which the driving support operation state is changed from the on state to the off state.

11. The control method according to claim 10, wherein the second calculating includes executing first correction processing for changing a first proportion that is a proportion of the first control amount in the motor control amount in the second period, and the first correction processing includes changing the first proportion such that, for the steering torque having a same magnitude, the first proportion in the second period becomes smaller than the first proportion in the first period.

12. The control method according to claim 11, wherein the driving operation switching request comprises a first request issued in response to an operation by the driver on an operation device, and a second request issued when a predetermined abnormality is detected, the first correction processing includes changing the first proportion such that the first proportion in a case in which the second request is issued becomes smaller than the first proportion in a case in which the first request is issued, and the second calculating further includes:

in the case in which the first request is issued, calculating the motor control amount such that the magnitude of the steering torque reaches the torque threshold when the driver changes the magnitude of the steering angle of the steering wheel by the second angle in the second period, and in the case in which the second request is issued, calculating the motor control amount such that the magnitude of the steering torque reaches the torque threshold when the driver changes the magnitude of the steering angle of the steering wheel by a third angle smaller than the second angle in the second period.

13. The control method according to claim 11, wherein the first control amount comprises a basic assist amount for assisting the operation by the driver on the steering wheel, and a compensation assist amount for compensating at least a part of the basic assist amount canceled by the second control amount, the second calculating includes executing, as the first correction processing, second correction processing for changing a second proportion that is a proportion of the compensation assist amount in the motor control amount, and the second correction processing includes changing the second proportion such that, for the steering torque having a same magnitude, the second proportion in the second period becomes smaller than the second proportion in the first period.

14. The control method according to claim 11, wherein the second calculating further includes, in a case in which the magnitude of the steering torque is larger than the torque threshold, executing the first correction processing such that, as the magnitude of the steering torque increases, the first proportion in the second period approaches the first proportion in the first period.

15. The control method according to claim 11, wherein the second controlling further includes determining whether the driver holds the steering wheel at the time point at which the driving operation switching request is issued, and the second calculating further includes, in a case in which it is determined that the driver holds the steering wheel at the time point at which the driving operation switching request is issued, executing, as the first correction processing, third correction processing for gradually reducing the first proportion with a lapse of time from the time point at which the driving operation switching request is issued.

* * * * *